United States Patent
Samoto et al.

(10) Patent No.: US 8,915,494 B2
(45) Date of Patent: Dec. 23, 2014

(54) IMAGE RECORDING APPARATUS

(71) Applicants: Kenji Samoto, Nagoya (JP); Yuji Koga, Nagoya (JP); Wataru Sugiyama, Nishio (JP)

(72) Inventors: Kenji Samoto, Nagoya (JP); Yuji Koga, Nagoya (JP); Wataru Sugiyama, Nishio (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/851,774

(22) Filed: Mar. 27, 2013

(65) Prior Publication Data

US 2013/0256976 A1  Oct. 3, 2013

(30) Foreign Application Priority Data

Mar. 27, 2012 (JP) ................. 2012-072601

(51) Int. Cl.
*B65H 5/06* (2006.01)
*B65H 85/00* (2006.01)
*B41J 3/60* (2006.01)
*B41J 3/407* (2006.01)
*B65H 3/06* (2006.01)

(52) U.S. Cl.
CPC .......... *B65H 5/06* (2013.01); *B65H 2301/3331* (2013.01); *B65H 2403/481* (2013.01); *B65H 85/00* (2013.01); *B65H 2405/3322* (2013.01); *B41J 3/60* (2013.01); *B41J 3/4071* (2013.01); *B65H 2402/46* (2013.01); *B65H 2404/63* (2013.01); *B65H 2403/72* (2013.01); *B65H 5/062* (2013.01); *B65H 2404/1115* (2013.01); *B65H 3/0684* (2013.01)
USPC ................. 271/10.11; 271/10.04; 271/10.13; 271/225

(58) Field of Classification Search
USPC ............ 271/10.03, 10.09, 10.11, 10.12, 242, 271/258.02, 10.13, 10.04, 4.04, 4.1, 225, 271/3.18, 3.14
See application file for complete search history.

(56) References Cited

U.S. PATENT DOCUMENTS

| | | | | |
|---|---|---|---|---|
| 5,755,435 A | * | 5/1998 | Fujiwara | 271/4.04 |
| 6,485,011 B1 | * | 11/2002 | Yen et al. | 271/10.03 |
| 6,811,151 B2 | * | 11/2004 | Wei-Feng et al. | 271/10.03 |
| 7,172,190 B2 | * | 2/2007 | Park | 271/10.13 |
| 7,562,870 B2 | * | 7/2009 | Terada | 271/270 |
| 8,152,161 B2 | * | 4/2012 | Samoto et al. | 271/186 |
| 2004/0032074 A1 | * | 2/2004 | Park | 271/4.01 |

FOREIGN PATENT DOCUMENTS

| | | | |
|---|---|---|---|
| JP | 06263274 A | * | 9/1994 |
| JP | H10-329974 A | | 12/1998 |
| JP | 2007-217179 A | | 8/2007 |

* cited by examiner

*Primary Examiner* — Luis A Gonzalez
(74) *Attorney, Agent, or Firm* — Baker Botts L.L.P.

(57) ABSTRACT

An image recording apparatus, including: a drive source rotatable forwardly and reversely; a first roller rotatable in a first direction by the forward rotation of the drive source to convey a conveyed medium and rotatable in a second direction reverse to the first direction by the reverse rotation of the drive source; a recording device; a second roller; a first power transmitter which transmits a first-direction driving power to the second roller and not to transmit a second-direction driving power to the second roller, wherein the first-direction driving power is a rotational driving power of the first roller rotating in the first direction, and the second-direction driving power is a rotational driving power of the first roller rotating in the second direction; and a second power transmitter which transmits the second-direction driving power to the second roller and not to transmit the first-direction driving power to the second roller.

20 Claims, 11 Drawing Sheets

| SWITCH GEAR 51 | FIRST POWER TRANSMISSION POSITION | | SECOND POWER TRANSMISSION POSITION | |
|---|---|---|---|---|
| CONVEYOR MOTOR 71 | FORWARD ROTATION | REVERSE ROTATION | FORWARD ROTATION | REVERSE ROTATION |
| FIRST CONVEYOR ROLLER 60 | FIRST DIRECTION (FIRST POWER TRANSMITTER 26) | DIRECTION OPPOSITE TO FIRST DIRECTION (FIRST POWER TRANSMITTER 26) | FIRST DIRECTION (FIRST POWER TRANSMITTER 26) | DIRECTION OPPOSITE TO FIRST DIRECTION (FIRST POWER TRANSMITTER 26) |
| SECOND CONVEYOR ROLLER 62 | FIRST DIRECTION (FIRST POWER TRANSMITTER 26) | STOPPED | FIRST DIRECTION (FIRST POWER TRANSMITTER 26) | DIRECTION OPPOSITE TO FIRST DIRECTION (SECOND POWER TRANSMITTER 27) |
| THIRD CONVEYOR ROLLER 45 | FIRST DIRECTION (THIRD POWER TRANSMITTER 33) | STOPPED | FIRST DIRECTION (THIRD POWER TRANSMITTER 33) | DIRECTION OPPOSITE TO FIRST DIRECTION (THIRD POWER TRANSMITTER 33) |
| FOURTH CONVEYOR ROLLER 68 | STOPPED | STOPPED | SECOND DIRECTION (FOURTH POWER TRANSMITTER 28) | SECOND DIRECTION (FOURTH POWER TRANSMITTER 28) |
| SUPPLY ROLLER 25 | STOPPED | FIRST DIRECTION (SUPPLY POWER TRANSMITTER 29) | STOPPED | STOPPED | ns
IMAGE RECORDING APPARATUS

CROSS REFERENCE TO RELATED APPLICATION

The present application claims priority from Japanese Patent Application No. 2012-072601, which was filed on Mar. 27, 2012, the disclosure of which is herein incorporated by reference in its entirety.

BACKGROUND OF THE INVENTION

1. Field of the Invention

The present invention relates to an image recording apparatus configured to record an image on a sheet.

2. Description of the Related Art

There is conventionally known an image recording apparatus configured to record an image on a sheet. A conveyance path through which the sheet passes is formed in the image recording apparatus. Rollers are provided on a plurality of positions on the conveyance path, and these rollers are rotated by a driving power transmitted from a drive source to convey the sheet through the conveyance path.

To satisfy recent demand for reducing size and cost of the image recording apparatus, the number of drive sources provided in the image recording apparatus is preferably reduced. That is, the above-described rollers are preferably rotated by a driving power produced by a common drive source.

There is known a conveyor mechanism including a plurality of rollers that are rotated by a driving power transmitted from a common drive motor. In this conveyor mechanism, a sheet-supply roller, a conveyor roller, and a discharge roller are rotated by the common motor. Specifically, the conveyor roller is rotated forwardly by forward rotation of the motor and rotated reversely by reverse rotation of the motor. The sheet-supply roller is rotated forwardly by the reverse rotation of the motor but is not rotated by the forward rotation of the motor. The discharge roller is rotated forwardly by the forward rotation of the motor but is not rotated by the reverse rotation of the motor.

SUMMARY OF THE INVENTION

Suppose that the above-described conveyor mechanism is mounted in an image recording apparatus having a duplex image recording function, for example. When images are recorded on both sides of a sheet, the discharge roller is rotated reversely to convey the sheet in a direction opposite to a normal sheet conveying direction. The sheet conveyed by the discharge roller in the direction opposite to the normal sheet conveying direction passes through a resupply conveyance path that is formed for duplex image recording and is branched from a main conveyance path. In the above-described conveyor mechanism, however, the discharge roller cannot be rotated reversely because the reverse rotation of the motor is not transmitted to the discharge roller. That is, in the above-described conveyor mechanism, the discharge roller cannot convey the sheet in the direction opposite to the normal sheet conveying direction.

This invention has been developed to provide an image recording apparatus in which a roller rotatable only in one direction in a certain situation is made rotatable in a direction reverse to the one direction in another situation.

The present invention provides an image recording apparatus, comprising: a drive source configured to perform forward rotation and reverse rotation; a first roller rotatable in a first direction by the forward rotation of the drive source to convey a conveyed medium in a conveying direction, the first roller being rotatable in a second direction by the reverse rotation of the drive source, the second direction being reverse to the first direction; a recording device disposed downstream of the first roller in the conveying direction and configured to record an image on the conveyed medium; a second roller disposed downstream of the recording device in the conveying direction; a first power transmitter configured to transmit a first-direction driving power to the second roller and not to transmit a second-direction driving power to the second roller, wherein the first-direction driving power is a rotational driving power of the first roller rotating in the first direction, and the second-direction driving power is a rotational driving power of the first roller rotating in the second direction; and a second power transmitter configured to transmit the second-direction driving power of the first roller to the second roller and not to transmit the first-direction driving power of the first roller to the second roller.

The present invention also provides An image recording apparatus, comprising: a drive source configured to perform forward rotation and reverse rotation; a first roller rotatable in a first direction by the forward rotation of the drive source to convey a sheet in a conveying direction, the first roller being rotatable in a second direction by the reverse rotation of the drive source, the second direction being reverse to the first direction; a recording device provided downstream of the first roller in the conveying direction to record an image on the sheet, the recording device being reciprocable in main scanning directions perpendicular to the conveying direction; a second roller provided downstream of the recording device in the conveying direction; a tray configured to hold the sheet; a supply roller configured to supply the sheet on the tray toward the first roller; a first power transmitter configured to transmit a first-direction driving power to the second roller and not to transmit a second-direction driving power to the second roller, wherein the first-direction driving power is a rotational driving power of the first roller rotating in the first direction, and the second-direction driving power is a rotational driving power of the first roller rotating in the second direction; a second power transmitter configured to transmit the second-direction driving power of the first roller to the second roller and not to transmit the first-direction driving power of the first roller to the second roller; a supply power transmitter configured to transmit the second-direction driving power to the supply roller and not to transmit the first-direction driving power to the supply roller; a first roller gear configured to receive the rotational driving power of the first roller; a switcher comprising a contact member contactable with a carriage as the recording device moved in the main scanning directions, the switcher being configured to be switched, by contact of the carriage with the contact member, between a first position at which the switcher is coupled to the first roller gear and not coupled to the second power transmitter and coupled to the supply power transmitter and a second position at which the switcher is coupled to the first roller gear and coupled to the second power transmitter and not coupled to the supply power transmitter; and a controller configured to control the drive source and the carriage to execute: a first control in which the controller controls the drive source to perform the reverse rotation by a first rotational amount in a state in which the switcher is located at the first position, then controls the drive source to perform the forward rotation by a second rotational amount to convey the sheet to a position at which an upstream edge of the sheet in the conveying direction passes through the first roller, and then controls the drive source to perform the reverse rotation by a third rotational amount; and a second control in which the controller controls the drive source to perform the reverse rotation by a fourth rotational amount in the state in which the switcher is located at the first position, then controls the drive source to perform the forward rotation by a fifth rotational amount to convey the sheet to the position at which the upstream edge of the sheet in the conveying direction passes through the first roller, and then controls the drive source to perform the reverse rotation by a sixth rotational amount in a state in which the switcher is located at the second position.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 2 is an elevational view in vertical cross section schematically illustrating an internal structure of a printing section 11;

FIG. 8 is a table for explaining sheet conveying directions by supply rollers 25 and conveyor rollers 60, 62, 45, 68, which are determined by a position of the switch gear 51 and a forward or a reverse rotation of a conveyor motor 71;

DETAILED DESCRIPTION OF THE EMBODIMENTS

Figure 1:
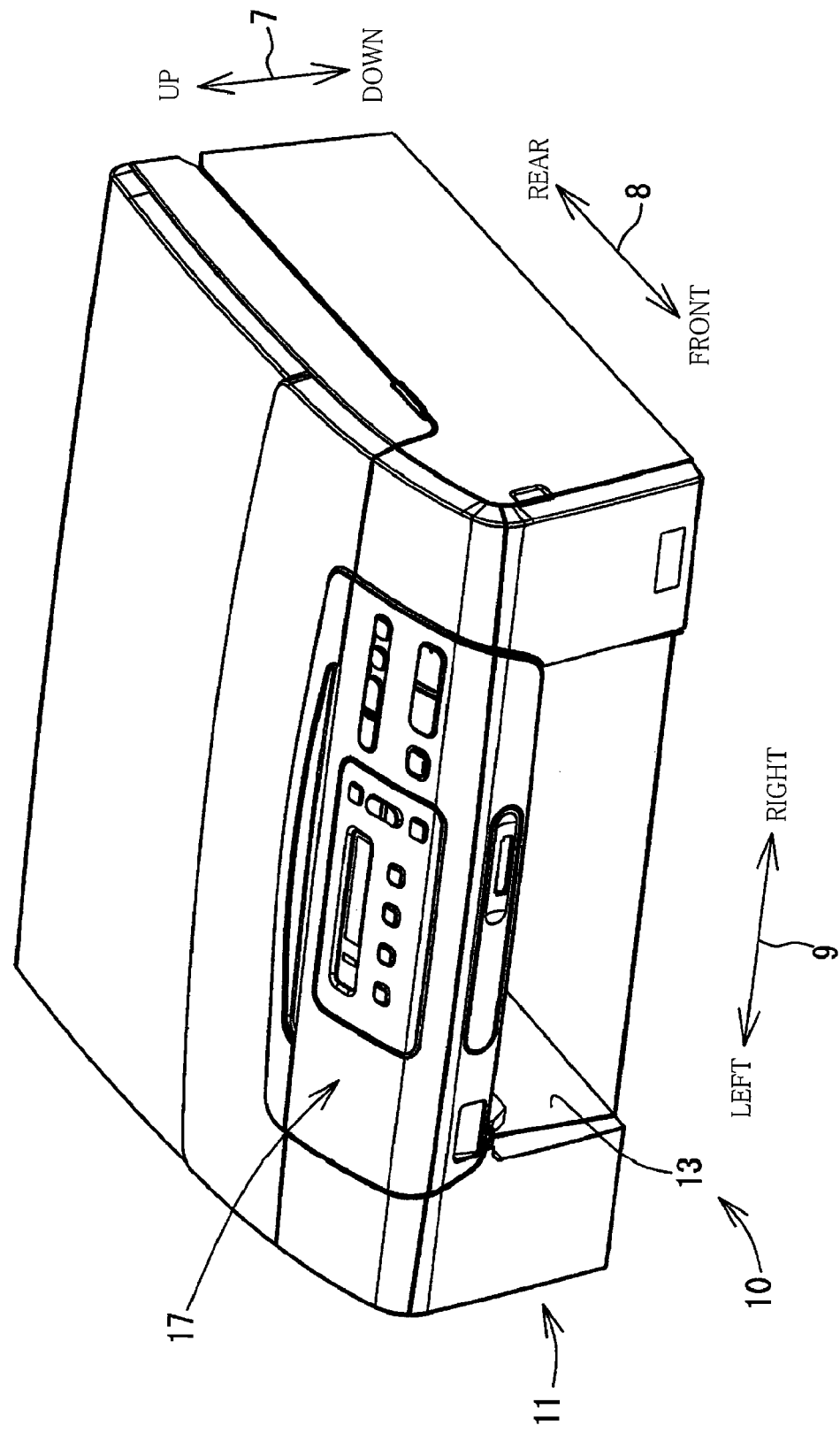
FIG. 1 is a perspective view illustrating an MFP 10.

Hereinafter, there will be described one embodiment of the present invention by reference to the drawings. It is to be understood that the following embodiment is described only by way of example, and the invention may be otherwise embodied with various modifications without departing from the scope and spirit of the invention. A multi-function peripheral (MFP) 10 is used in a state illustrated in FIG. 1. In the present embodiment, three arrows illustrated in FIG. 1 indicate up and down directions 7, front and rear directions 8, and right and left directions 9. In the following explanation, the up and down directions 7 are defined as up and down directions of the MFP 10 illustrated in FIG. 1, i.e., the MFP 10 being in a normal state. Also, the front and rear directions 8 are defined by regarding a side of the MFP 10 on which an opening 13 is formed as a front side, and the right and left directions 9 are defined in a state in which the MFP 10 is seen from the front side. It is noted that the directions illustrated in FIG. 1 are also indicated in other drawings in a similar manner. Also, in the following explanation, the term "direction" means a one-way direction which is directed from one point toward another point, and the term "directions" means opposite directions. That is, the term "directions" includes a direction directed from one point toward another point and a direction directed from said another point toward the one point.

<Overall Structure of MFP 10>

The MFP 10 is one example of an image recording apparatus as one embodiment according to the present invention. As illustrated in FIG. 1, the MFP 10 includes a printing section 11 at its lower portion. The MFP 10 has various functions such as a facsimile function and a printing function. The printing function includes a duplex image recording function for recording images on front and back faces of a recording sheet 12 as one example of a medium to be conveyed (i.e., a conveyed medium) and a sheet (see FIG. 2). The printing section 11 has the opening 13 in its front face. The MFP 10 includes: a supply tray 20 (see FIG. 2) on which the recording sheet 12 can be placed; and an output tray 21 (see FIG. 2). These trays 20, 21 can be inserted or removed through the opening 13 in the front and rear directions 8. It is noted that the MFP 10 can perform image recording not only on the recording sheet 12 but also on, e.g., a label face of a CD or a DVD. In this case, the CD or DVD is placed on a thin-plate shaped media tray and inserted into the MFP 10 through, e.g., the opening 13.

Figure 2:
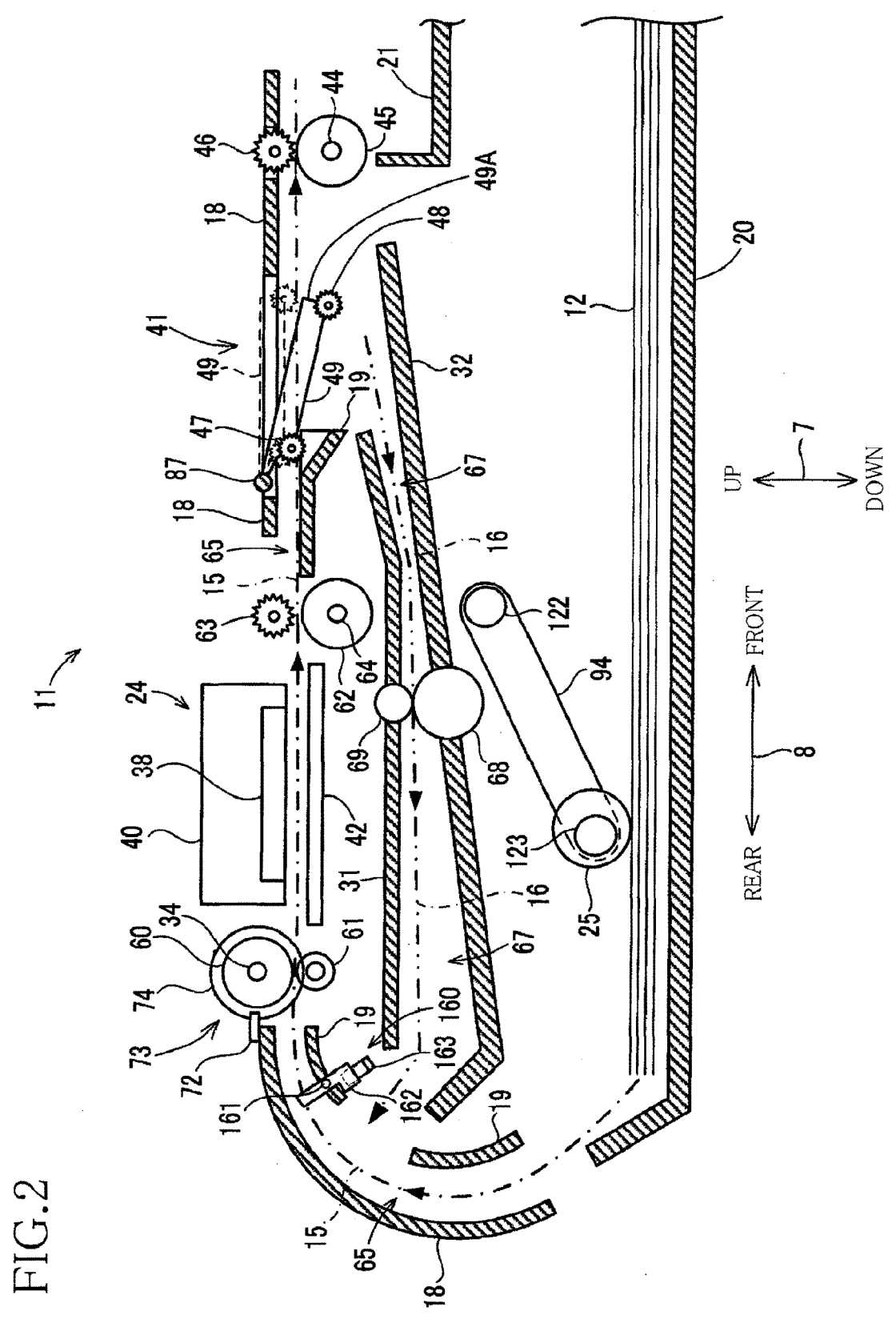

As illustrated in FIG. 2, supply rollers 25 are provided on an upper side of the supply tray 20. The supply tray 20 has a sheet-placed portion, i.e., an upper face, on which the recording sheet 12 is placed. The supply rollers 25 can contact the recording sheet 12 placed on the sheet-placed portion of the supply tray 20 from an upper side of the recording sheet 12. The supply rollers 25 are rotated in a second rotational direction by receiving a driving power from a conveyor motor 71 (as one example of a drive source, see FIGS. 3-5) rotating in its reverse direction. As a result, the recording sheet 12 placed on the supply tray 20 is supplied to a first conveyor roller 60 through a first conveyance path 65 as one example of a main conveyance path. It is noted that when the supply rollers 25 are rotated in the second rotational direction, the recording sheet 12 is conveyed in a first direction 15. Power transmission from the first conveyor roller 60 and the conveyor motor 71 to the supply rollers 25 will be explained later.

The first conveyance path 65 extends from a rear end portion of the supply tray 20. The first conveyance path 65 includes a curved portion and a straight portion. The first conveyance path 65 is defined by an outer guide member 18 and an inner guide member 19 which are opposed to each other at a predetermined distance therebetween. The recording sheet 12 placed on the supply tray 20 is conveyed through the curved portion from its lower side toward upper side so as to make a U-turn. The recording sheet 12 is then conveyed to a recording portion 24 (as one example of a recording device) through the straight portion. The recording portion 24 performs image recording on the recording sheet 12. After the image recording, the recording sheet 12 is conveyed through the straight portion and discharged onto the output tray 21. That is, the recording sheet 12 is conveyed in the first direction 15 (as one example of a conveying direction) indicated by one-dot chain-line arrow in FIG. 2. It is noted that the recording portion 24 will be explained later in detail.

<First Conveyor Roller 60, Second Conveyor Rollers 62, and Third Conveyor Rollers 45>

As illustrated in FIG. 2, a plurality of roller pairs are provided in the first conveyance path 65. Specifically, a pair of the first conveyor roller 60 (as one example of a first roller) and pinch rollers 61 are provided upstream of the recording portion 24 in the first direction 15. Also, a pair of a spur 63 and second conveyor rollers 62 (as one example of a second roller) are provided downstream of the recording portion 24 in the first direction 15. Also, a pair of a spur 46 and third conveyor rollers 45 (as one example of a third roller) are provided downstream of the second conveyor rollers 62 in the first direction 15. Each of the roller pairs is rotated while nipping the recording sheet 12 to convey the recording sheet 12.

The first conveyor roller 60 is rotated by a driving power transmitted from the conveyor motor 71. The conveyor motor 71 is rotatable in its forward direction or reverse direction. When a driving power produced by the forward rotation of the conveyor motor 71 is transmitted to the first conveyor roller 60, the first conveyor roller 60 is rotated in a first rotational direction to convey the recording sheet 12 in the first direction 15. When a driving power produced by the reverse rotation of the conveyor motor 71 is transmitted to the first conveyor roller 60, the first conveyor roller 60 is rotated in the second rotational direction reverse to the first rotational direction to convey the recording sheet 12 in a direction opposite to the first direction 15. The first conveyor roller 60 transmits the power to the second conveyor rollers 62 and the third conveyor rollers 45 via a drive-power transmitting mechanism 50 (see FIGS. 3-6) which will be described below.

It is noted that, in the present embodiment, the first conveyor roller 60 contacts a recording face of the sheet conveyed through the first conveyance path 65 (i.e., a face of the sheet on which an image is recorded by the recording portion 24 which will be described below), and each of the second conveyor rollers 62 and the third conveyor rollers 45 contacts a face of the sheet which is on a back of the recording face. That is, when the first conveyor roller 60 is rotated in the first rotational direction to convey the recording sheet 12 in the first direction 15, the second conveyor rollers 62 and the third conveyor rollers 45 are rotated in the second rotational direction. On the other hand, when the first conveyor roller 60 is rotated in the second rotational direction, each of the second conveyor rollers 62 and the third conveyor rollers 45 is rotated in the first rotational direction. It is noted that, in FIG. 2, the first rotational direction is a direction in which each roller 60, 62, 45 is rotated in a counterclockwise direction, and the second rotational direction is a direction in which each roller 60, 62, 45 is rotated in a clockwise direction.

In the duplex image recording, the conveying direction of the recording sheet 12 conveyed through the first conveyance path 65 is switched between the second conveyor rollers 62 and the third conveyor rollers 45 such that the recording sheet 12 is conveyed to a second conveyance path 67 which will be described below.

<Recording Portion 24>

As illustrated in FIG. 2, the recording portion 24 is provided downstream of the first conveyor roller 60 and upstream of the second conveyor rollers 62 in the first direction 15. A platen 42 is provided under the recording portion 24 so as to be opposed to the recording portion 24. The platen 42 supports the recording sheet 12 conveyed through the first conveyance path 65. The recording portion 24 employs a well-known ink-jet ejection method to record an image on the recording sheet 12 supported on the platen 42. The recording portion 24 includes: a recording head 38 having a multiplicity of nozzles to eject ink droplets onto the recording sheet 12 therethrough; and a carriage 40 for holding the recording head 38 mounted thereon.

The carriage 40 is supported by, e.g., a frame of the printing section 11 so as to be reciprocable in main scanning directions that coincide with the right and left directions 9 perpendicular to the front and rear directions 8. The carriage 40 is coupled to a carriage drive motor 53 (see FIG. 9) by a well-known belt mechanism. Upon receipt of a driving power transmitted from the carriage drive motor 53, the carriage 40 is reciprocated in the right and left directions 9. This reciprocation of the carriage 40 is performed in a state in which the recording sheet 12 is supported on the platen 42. The recording head 38 ejects ink droplets in the reciprocation of the carriage 40. As a result, an image is recorded on the recording sheet 12 supported on the platen 42. It is noted that a method for recording an image on the recording sheet 12 by the recording portion 24 is not limited to the ink-jet method and may be an electronic photographic method, for example.

<Sensor 160>

As illustrated in FIG. 2, a sensor 160 is provided in the first conveyance path 65 at a position upstream of the first conveyor roller 60 in the first direction 15. The sensor 160 includes: a shaft 161; a detector 162 pivotable about the shaft 161; and an optical sensor 163 that includes a light emitting element and a light receiving element for receiving light emitted from the light emitting element.

One end of the detector 162 projects into the first conveyance path 65. When an external force is not applied to the one end of the detector 162, the other end of the detector 162 is located in a light path extending from the light emitting element to the light receiving element to interrupt the light traveling through the light path. In this state, the optical sensor 163 outputs a low-level signal to a controller 130 which will be described below. When the one end of the detector 162 is pressed by a leading edge of the recording sheet 12 to rotate the detector 162, the other end of the detector 162 is moved out of the light path, causing the light to pass through the light path. In this state, the optical sensor 163 outputs a high-level signal to the controller 130. On the basis of the signal received from the optical sensor 163, the controller 130 senses the leading edge and a trailing edge of the recording sheet 12 in the first direction 15.

<Rotary Encoder 73>

As illustrated in FIGS. 2-5, the first conveyor roller 60 is provided with a rotary encoder 73 that produces a pulse signal in response to the rotation of the first conveyor roller 60. The rotary encoder 73 includes an optical sensor 72 and an encoder disc 74 provided on a shaft 34 of the first conveyor roller 60 so as to be rotated along with the first conveyor roller 60. The encoder disc 74 includes: light transmitting portions allowing light to pass therethrough; and light intercepting portions inhibiting the light from passing therethrough. These light transmitting portions and light intercepting portions are alternately arranged at regular pitches in a circumferential direction so as to form a predetermined pattern. The rotary encoder 73 produces a pulse signal each time when the light transmitting portion and the light intercepting portion are sensed by the optical sensor 72 during the rotation of the encoder disc 74. The produced pulse signals are transmitted to the controller 130. The controller 130 detects a rotational amount of the first conveyor roller 60 on the basis of the pulse signals. As will be described below, the conveyor rollers 60, 62, 45 are coupled to one another by belts. Thus, the controller 130 can also detect rotational amounts of the second conveyor rollers 62 and the third conveyor rollers 45 on the basis of the pulse signals.

<Path Switching Member 41 and Second Conveyance Path 67>

As illustrated in FIG. 2, a path switching member 41 as one example of a switch mechanism is provided between the second conveyor rollers 62 and the third conveyor rollers 45. The path switching member 41 includes auxiliary rollers 47, 48, a flap 49, and a shaft 87. The flap 49 is pivotably supported by the shaft 87 so as to extend from the shaft 87 substantially in the first direction 15. The auxiliary rollers 47, 48 each having a spur shape are provided respectively on shafts provided on the flap 49.

The flap 49 is pivoted between (i) a discharge orientation indicated by broken lines in FIG. 2 which allows the recording sheet 12 to be discharged onto the output tray 21 and (ii) a flip orientation indicated by solid lines in FIG. 2 in which a free end portion 49A of the flap 49 is located at a position lower than that in the discharge orientation.

In a standby state of the MFP 10, the flap 49 is located at the flip orientation by its own weight. When the recording sheet 12 conveyed through the first conveyance path 65 comes into contact with the flap 49, the flap 49 is moved upward so as to be pivoted to the discharge orientation. The flap 49 (specifically, the auxiliary rollers 47, 48) thereafter guides the recording sheet 12 while contacting the recording sheet 12. When an upstream edge, i.e., the trailing edge of the recording sheet 12 in the first direction 15 passes through the auxiliary roller 47, the flap 49 is pivoted by its own weight from the discharge orientation to the flip orientation. As a result, the upstream edge of the recording sheet 12 in the first direction 15 is moved downward so as to be directed toward (i.e., so as to face or point) the second conveyance path 67 (as one example of a reverse conveyance path) which will be described below. When the third conveyor rollers 45 continue to be rotated in the second rotational direction in this state, the recording sheet 12 is conveyed in the first direction 15 and discharged onto the output tray 21. On the other hand, when a rotational direction of the third conveyor rollers 45 is switched to the first rotational direction, the recording sheet 12 is conveyed in a direction opposite to the first direction 15 so as to enter into the second conveyance path 67.

The second conveyance path 67 is branched from a position between the second conveyor rollers 62 and the third conveyor rollers 45 so as to be merged with the first conveyance path 65 at a position upstream of the first conveyor roller 60 in the first direction 15. It is noted that the second conveyance path 67 is defined by guide members 31, 32.

<Fourth Conveyor Rollers 68>

As illustrated in FIG. 2, fourth conveyor rollers 68 as one example of a fourth roller and a driven roller 69 are provided in the second conveyance path 67. The fourth conveyor rollers 68 are disposed in the second conveyance path 67 at a position under and opposite to the driven roller 69.

The driving power of the conveyor motor 71 is transmitted to the fourth conveyor rollers 68 via a fourth power transmitter 28 of the drive-power transmitting mechanism 50 which will be described below. Upon receipt of the driving power, the fourth conveyor rollers 68 are rotated in such a direction that the recording sheet 12 is conveyed in a second direction 16 along the second conveyance path 67. Specifically, the fourth conveyor rollers 68 are rotated only in the counterclockwise direction (i.e., the first rotational direction) in FIGS. 2 and 6. Here, the second direction 16 is a direction directed along the second conveyance path 67 from the position between the second conveyor rollers 62 and the third conveyor rollers 45 toward a position located upstream of the first conveyor roller 60 in the first direction 15. This second direction 16 is indicated by two-dot chain-line arrow in FIG. 2.

In view of the above, when the recording sheet 12 conveyed into the second conveyance path 67 by the third conveyor rollers 45 is nipped between the fourth conveyor rollers 68 and the driven roller 69, the recording sheet 12 is conveyed by the fourth conveyor rollers 68 in the second direction 16. As a result, the recording sheet 12 is delivered to a position located upstream of the first conveyor roller 60 in the first direction 15. Power transmission from the conveyor motor 71 to the fourth conveyor rollers 68 will be explained later.

<Drive-power Transmitting Mechanism 50>

Figure 3:
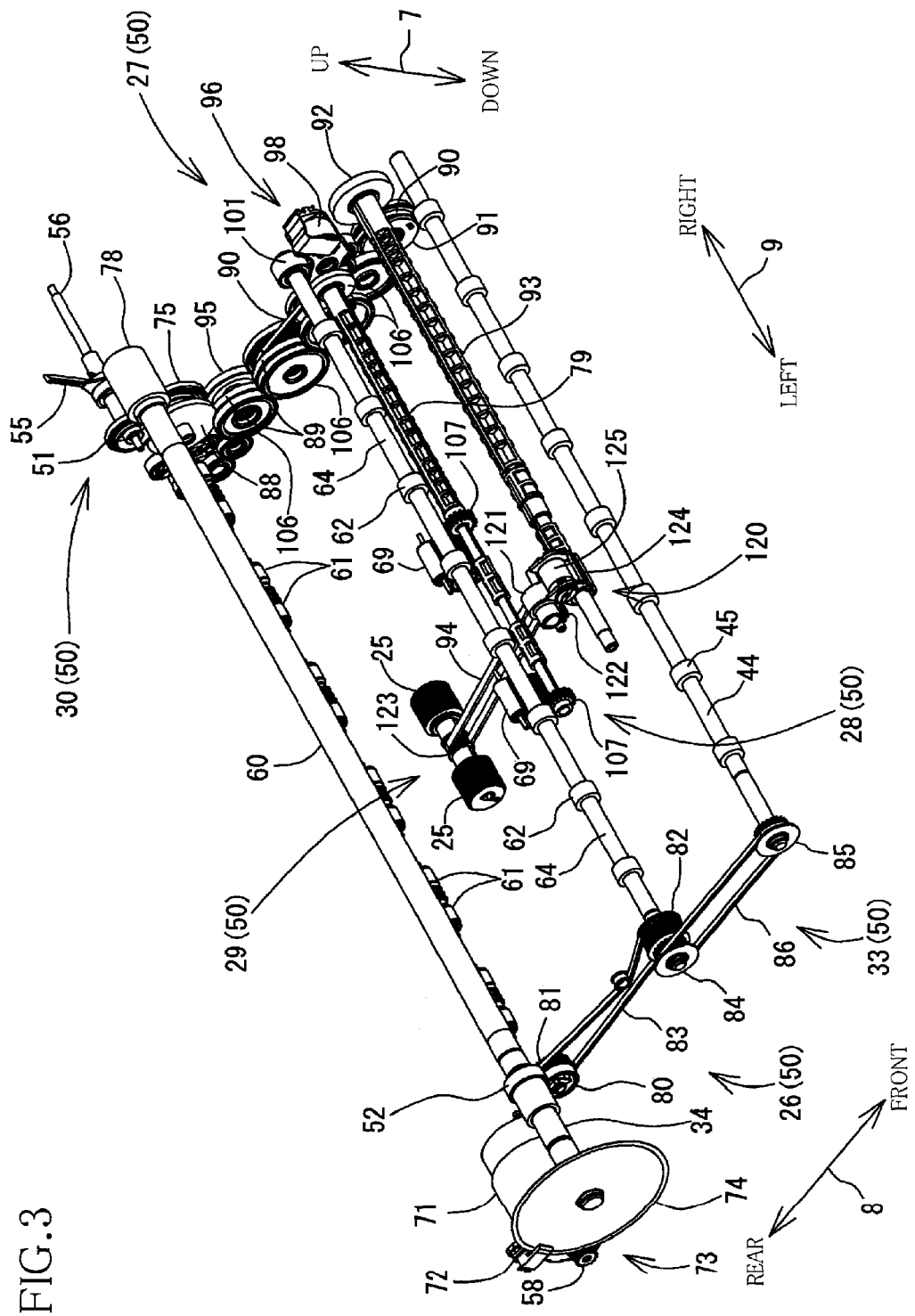
FIG. 3 is a perspective view illustrating a drive-power transmitting mechanism 50 and conveyor rollers 60, 62, 45.
Figure 4:
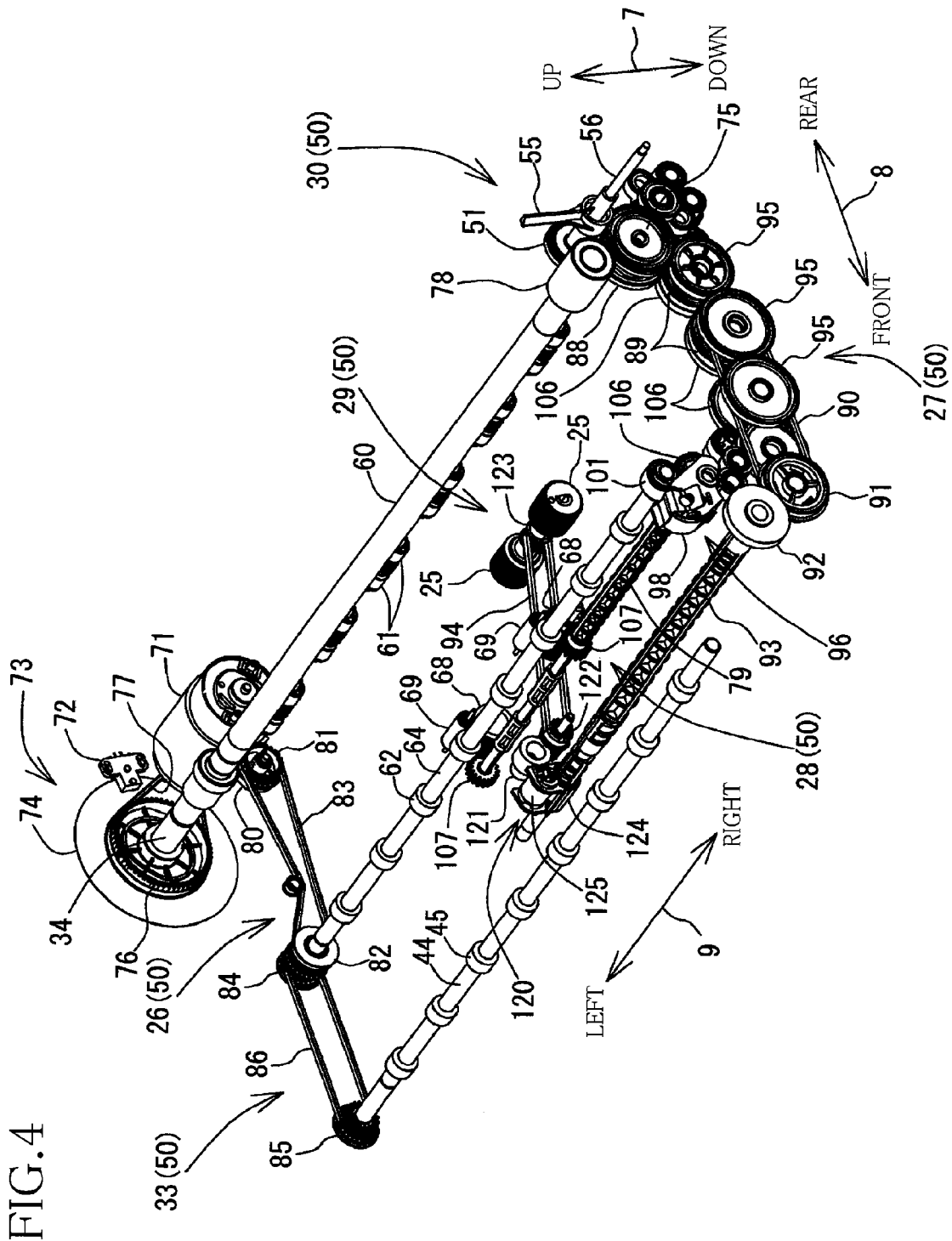
FIG. 4 is a perspective view illustrating the drive-power transmitting mechanism 50 and the conveyor rollers 60, 62, 45.
Figure 5:
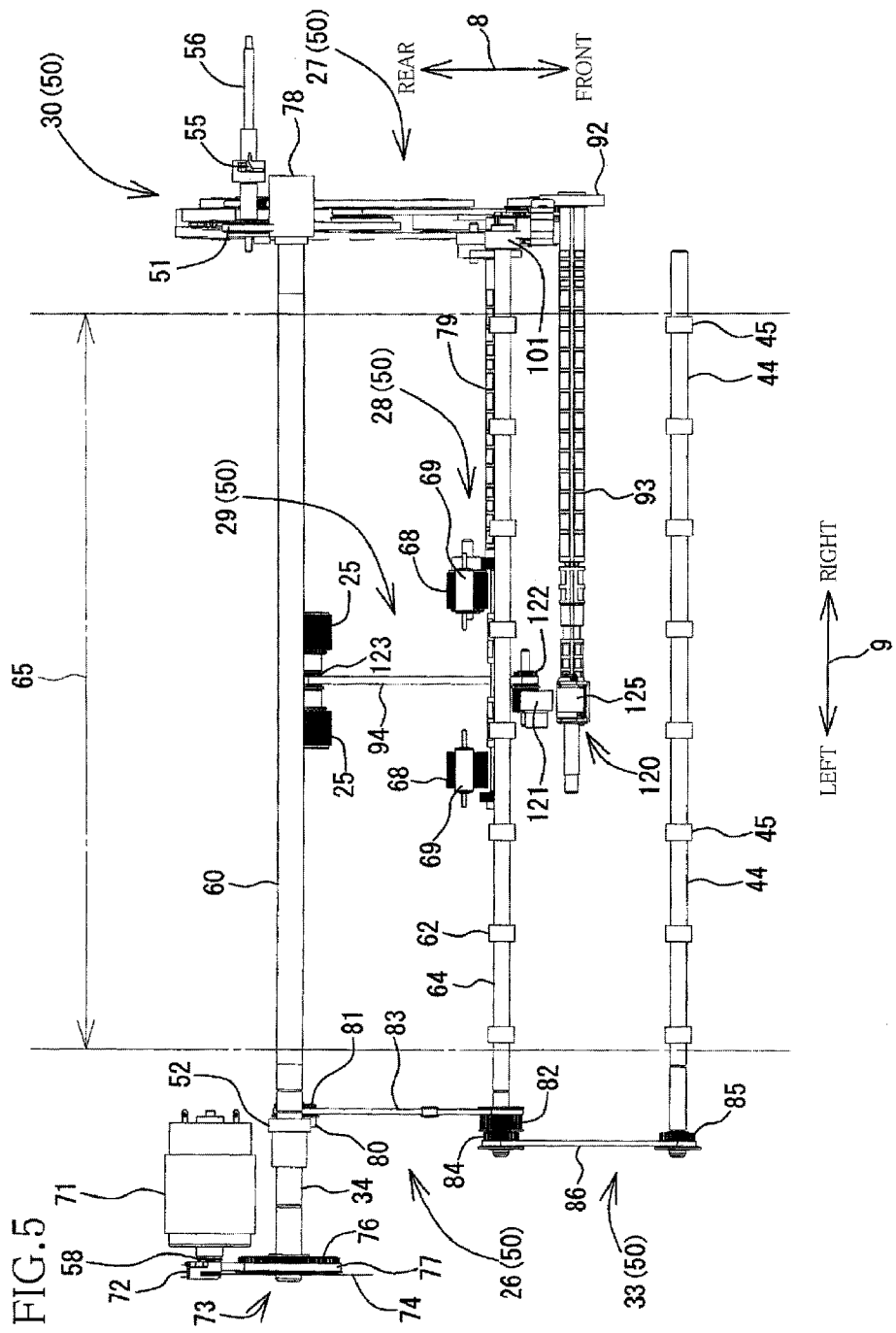
FIG. 5 is a plan view illustrating the drive-power transmitting mechanism 50 and the conveyor rollers 60, 62, 45.

As illustrated in FIGS. 3-5, the printing section 11 is provided with the drive-power transmitting mechanism 50. The drive-power transmitting mechanism 50 includes a roller pulley 76, a motor pulley 58, a first belt 77, a first power transmitter 26, a second power transmitter 27, a third power transmitter 33, the fourth power transmitter 28, a supply power transmitter 29, and a switcher 30. In the present embodiment, the second power transmitter 27 and the third power transmitter 33 are one example of a second power transmitter.

The drive-power transmitting mechanism 50 causes the rollers 60, 62, 45, 68, 25 to be rotated so as to convey the recording sheet 12 in their respective directions described in FIG. 8. That is, the drive-power transmitting mechanism 50 causes the rollers 60, 62, 45, 68, 25 to be rotated depending upon a position of a switch gear 51 of the switcher 30 and the rotational direction of the conveyor motor 71. The rollers 60, 62, 45, 68, 25 are rotated by the drive power transmitted from the conveyor motor 71 via any of the first power transmitter 26, the second power transmitter 27, the third power transmitter 33, the fourth power transmitter 28, and the supply power transmitter 29. It is noted that in FIG. 8 each of the rollers 60, 62, 45, 68, 25 receives the rotational driving power from the conveyor motor 71 via a transmitter whose name is described in corresponding parentheses.

As illustrated in FIG. 5, the roller pulley 76 is mounted on the shaft 34 of the first conveyor roller 60 on a left side of the first conveyance path 65. As illustrated in FIGS. 3-5, the motor pulley 58 is mounted on a rotation shaft of the conveyor motor 71. The endless first belt 77 is looped over the roller pulley 76 and the motor pulley 58. As a result, the rotational driving power of the conveyor motor 71 is transmitted to the first conveyor roller 60. Specifically, when the conveyor motor 71 is rotated in the forward direction, the first conveyor roller 60 is rotated in the first rotational direction, and when the conveyor motor 71 is rotated in the reverse direction, the first conveyor roller 60 is rotated in the second rotational direction.

<First Power Transmitter 26>

As illustrated in FIGS. 3-6, the first power transmitter 26 includes a left gear 52, a lower gear 80, a first pulley 81, a second pulley 82, and a second belt 83. The left gear 52 is mounted on the shaft 34 of the first conveyor roller 60 on a left side of the first conveyance path 65. The lower gear 80 is provided under the left gear 52 so as to be in meshed engagement with the left gear 52. The first pulley 81 is mounted on a right face of the lower gear 80 so as to be rotated coaxially and together with the lower gear 80. As a result, the first pulley 81 is rotated along with the rotation of the first conveyor roller 60. The second pulley 82 is mounted on a shaft 64 of the second conveyor rollers 62. The endless second belt 83 is looped over the first pulley 81 and the second pulley 82. As a result, the rotation of the first conveyor roller 60 rotates the second belt 83, causing the rotational driving power of the first conveyor roller 60 to be transmitted to the second conveyor rollers 62.

<Third Power Transmitter 33>

As illustrated in FIGS. 3-6, the third power transmitter 33 includes a third pulley 84, a fourth pulley 85, and a third belt 86. The third pulley 84 is mounted on the shaft 64 on a left side of the second pulley 82 so as to be rotated coaxially and together with the second pulley 82. The fourth pulley 85 is mounted on a shaft 44 of the third conveyor rollers 45. The endless third belt 86 is looped over the third pulley 84 and the fourth pulley 85. As a result, the rotational driving power of the second conveyor rollers 62 is transmitted to the third conveyor rollers 45. That is, the third conveyor rollers 45 are rotated with the rotation of the second conveyor rollers 62 by receiving the rotational driving power from the second conveyor rollers 62.

Figure 6:
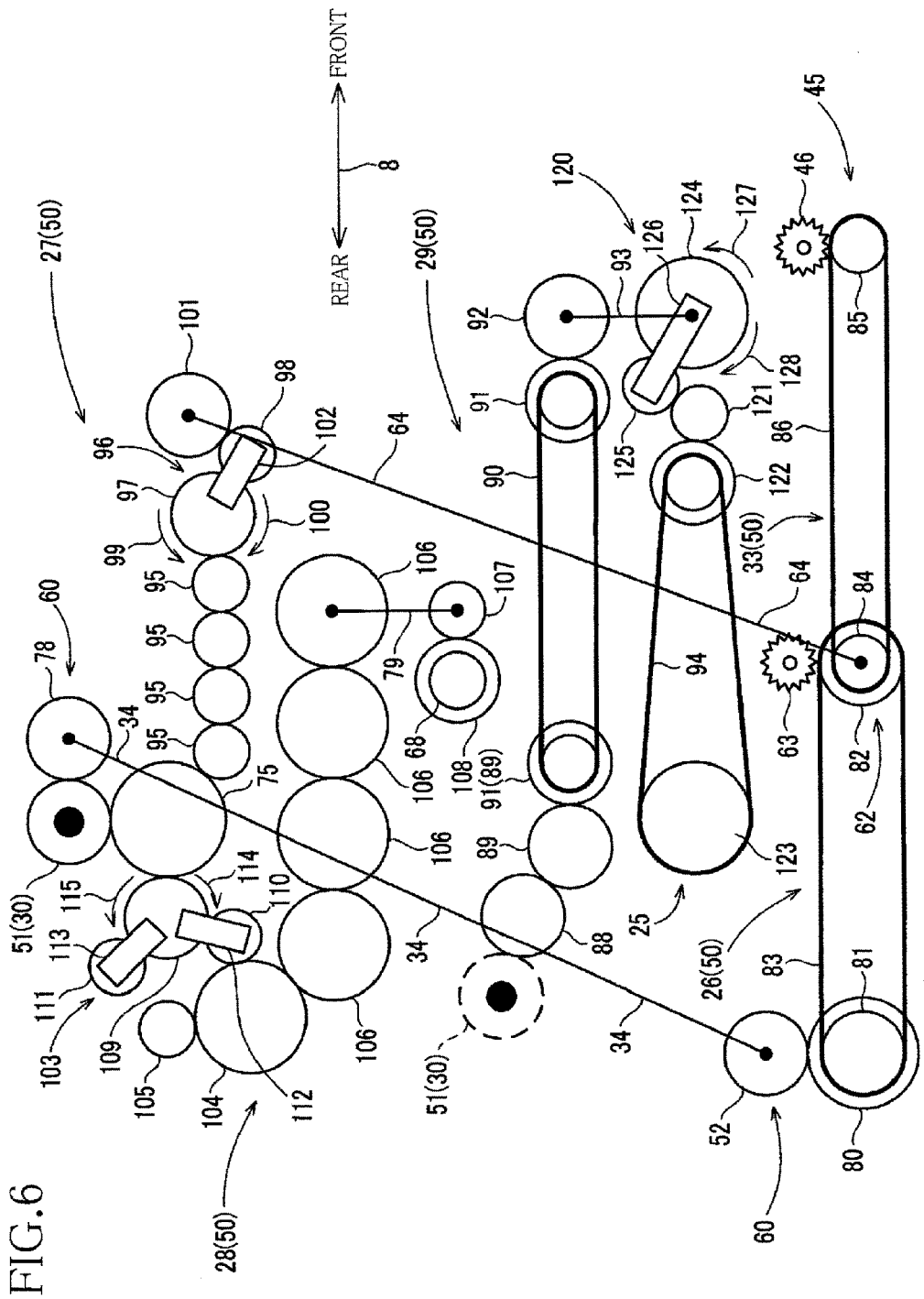
FIG. 6 is a schematic view of the drive-power transmitting mechanism 50 as seen from a left side, illustrating a power-transmission relationship among rollers, belts, gears, and pulleys of the drive-power transmitting mechanism 50.

In the following explanation, each of the clockwise direction, i.e., the second rotational direction and the counterclockwise direction, i.e., the first rotational direction is a rotational direction of each roller and each gear in FIG. 6. That is, each of the clockwise direction and the counterclockwise direction is a rotational direction of each roller and each gear when each roller and each gear are seen from the left side. Accordingly, it is to be understood that, when each roller and each gear are seen from the right side, for example, the clockwise direction and the counterclockwise direction respectively coincide with the first rotational direction and the second rotational direction. A well-known one-way clutch (specifically, a needle clutch) is provided inside the second pulley 82. That is, the second pulley 82 is mounted on the shaft 64 via the one-way clutch. As a result, as illustrated in FIG. 6, in the present embodiment, when the conveyor motor 71 is rotated in the forward direction, the shaft 64 is rotated in the clockwise direction, i.e., the second rotational direction, but when the conveyor motor 71 is rotated in the reverse direction, the shaft 64 is not rotated. Accordingly, when the conveyor motor 71 is rotated in the forward direction, the forward rotational driving power is transmitted to the conveyor rollers 60, 62, 45, causing the conveyor rollers 60, 62, 45 to be rotated so as to convey the recording sheet 12 in the first direction 15. Specifically, in the present embodiment, the first conveyor roller 60 is rotated in the counterclockwise direction, i.e., the first rotational direction, and each of the second conveyor rollers 62 and the third conveyor rollers 45 is rotated in the clockwise direction, i.e., the second rotational direction. On the other hand, when the conveyor motor 71 is rotated in the reverse direction, the reverse rotational driving power is transmitted to the first conveyor roller 60, but the second pulley 82 slips on the shaft 64 by the one-way clutch. Thus, the reverse rotational driving power is not transmitted to the second conveyor rollers 62. As a result, only the first conveyor roller 60 is rotated in the clockwise direction, i.e., the second rotational direction so as to convey the recording sheet 12 in the direction opposite to the first direction 15, and the second conveyor rollers 62 and the third conveyor rollers 45 are not rotated.

<Second Power Transmitter 27>

As illustrated in FIGS. 3-6, the second power transmitter 27 includes: a first gear 78 as one example of a first roller gear; a second gear 101 as one example of a drive mechanism or a second roller gear; a first output gear 75; a plurality of first intermediate gears 95 (as one example of a transmitter unit) meshed with one another; and a first planetary gear mechanism 96. The first planetary gear mechanism 96 includes: a sun gear 97 meshed with a frontmost one of the first intermediate gears 95; a planetary gear 98 rotatable while revolving around the sun gear 97; and an arm 102.

The first gear 78 is provided on the shaft 34 of the first conveyor roller 60 on a right side of the first conveyance path 65. When the first conveyor roller 60 is rotated, the first gear 78 is also rotated. That is, the first gear 78 is provided coaxially with the first conveyor roller 60 and rotated together with the first conveyor roller 60. As a result, the rotational driving power is transmitted from the first gear 78 to the first output gear 75 via the switch gear 51 of the switcher 30 which will be described below.

The first output gear 75 is in meshed engagement with: the switch gear 51; a rearmost one of the first intermediate gears 95; and a sun gear 109 of a second planetary gear mechanism 103 of the fourth power transmitter 28 which will be described below. It is noted that, as will be described below, when the switch gear 51 is located at a second power transmission position, the first output gear 75 is meshed with the switch gear 51, so that the rotational driving power is transmitted from the first gear 78 to the first output gear 75 (see FIG. 7B).

The first intermediate gears 95 are arranged substantially in the front and rear directions 8 in a state in which the first intermediate gears 95 are meshed with one another. In the present embodiment, an even number of the first intermediate gears 95 are arranged. It is to be understood that, while the four first intermediate gears 95 are illustrated in FIG. 6, the number of the first intermediate gears 95 is not limited to four. The frontmost first intermediate gear 95 is meshed with the sun gear 97 of the first planetary gear mechanism 96. In view of the above, the rotational driving power of the first gear 78 is transmitted to the sun gear 97 via the first output gear 75 and the first intermediate gears 95.

The sun gear 97 is rotatably supported by, e.g., the frame of the printing section 11. The sun gear 97 has a thrust face on which one end of the arm 102 is mounted. As a result, the arm 102 is rotated coaxially with the sun gear 97. The planetary gear 98 is rotatably supported on the other end of the arm 102. The planetary gear 98 is in meshed engagement with the sun gear 97. Thus, the planetary gear 98 is rotated while supported by the arm 102 and is revolved in a rotational direction of the sun gear 97 while meshed with the sun gear 97.

There will be next explained power transmission of the second power transmitter 27 with reference to FIG. 6. When the conveyor motor 71 (see FIGS. 3-5) is rotated in the reverse direction, each of the first conveyor roller 60 and the first gear 78 is rotated in the clockwise direction, i.e., the second rotational direction. Here, the switch gear 51, the first output gear 75, and the even number of the first intermediate gears 95 are provided between the first gear 78 and the sun gear 97, that is, an even number of gears are arranged in series between the first gear 78 and the sun gear 97 in a state in which these gears are meshed with one another. Thus, when the first gear 78 is rotated in the clockwise direction, the sun gear 97 is rotated in the counterclockwise direction, i.e., in a direction indicated by arrow 99.

When the sun gear 97 is rotated in the counterclockwise direction, the planetary gear 98 is revolved around the sun gear 97 in the direction indicated by arrow 99. As a result, the planetary gear 98 is connected to and meshed with the second gear 101. Here, the second gear 101 is provided on a right end portion of the shaft 64 of the second conveyor rollers 62 (see FIGS. 3-5) and rotated together with the second conveyor rollers 62. When the planetary gear 98 and the second gear 101 are connected to and meshed with each other, the planetary gear 98 stops revolving and starts rotating. A direction of the rotation of the planetary gear 98 is the clockwise direction. Thus, when the planetary gear 98 is rotated, the second gear 101 connected to and meshed with the planetary gear 98, i.e., the second conveyor rollers 62 are rotated in the counterclockwise direction, i.e., the first rotational direction, that is, the second conveyor rollers 62 are rotated in the direction in which the recording sheet 12 is conveyed in the direction opposite to the first direction 15.

The rotational driving power of the second conveyor rollers 62 in the counterclockwise direction, i.e., the first rotational direction is transmitted to the third conveyor rollers 45 via the third pulley 84, the third belt 86, and the fourth pulley 85. As a result, the third conveyor rollers 45 are also rotated in the counterclockwise direction, i.e., the first rotational direction, that is, the third conveyor rollers 45 are also rotated in the direction in which the recording sheet 12 is conveyed in the direction opposite to the first direction 15.

On the other hand, when the conveyor motor 71 is rotated in the forward direction, the first gear 78 and the sun gear 97 are rotated in the clockwise direction in contrast to the above-described case. Thus, the planetary gear 98 is revolved around the sun gear 97 in a direction indicated by arrow 100. As a result, the planetary gear 98 is disconnected from the second gear 101. Thus, the second power transmitter 27 does not cause the rotations of the second conveyor rollers 62 and the third conveyor rollers 45.

In view of the above, the second power transmitter 27 transmits the rotational driving power of the first conveyor roller 60 in the second rotational direction (as one example of a second-direction driving power) to the second conveyor rollers 62. On the other hand, the second power transmitter 27 does not transmit the rotational driving power of the first conveyor roller 60 in the first rotational direction (as one example of a first-direction driving power) to the second conveyor rollers 62.

It is noted that, when the conveyor motor 71 is rotated in the forward direction, the forward rotational driving power of the conveyor motor 71 is transmitted to the second conveyor rollers 62 by the first power transmitter 26 and to the third conveyor rollers 45 by the third power transmitter 33 as described above. Thus, when the conveyor motor 71 is rotated in the forward direction, the conveyor rollers 60, 62, 45 are rotated so as to convey the recording sheet 12 in the first direction 15. That is, the first conveyor roller 60 is rotated in the counterclockwise direction, i.e., the first rotational direction, and the second conveyor rollers 62 and the third conveyor rollers 45 are rotated in the clockwise direction, i.e., the second rotational direction.

In the second power transmitter 27, the first intermediate gears 95 as one example of a speed reducer reduce a rotational speed of the first gear 78 and transmit the speed-reduced rotational power to the sun gear 97. To reduce the rotational speed of the first gear 78, for example, the first intermediate gears 95 are designed as described below in detail in the present embodiment. It is noted that the first gear 78 is not limited to the gear designed as described below in detail, and the rotational speed of the first gear 78 may be reduced by employing a well-known gear.

In the present embodiment, a gear pitch (i.e., a distance between teeth) of one of the first intermediate gears 95 is larger than that of the other gears of the second power transmitter 27. Thus, the rotational speed of the first gear 78 is reduced at the one of the first intermediate gears 95 with the large gear pitch, resulting in a reduced rotational speed of the second conveyor rollers 62 to which the rotational driving power is transmitted via the first intermediate gears 95.

<Fourth Power Transmitter 28>

As illustrated in FIGS. 3-6, the fourth power transmitter 28 includes: the second planetary gear mechanism 103; a forward-rotation meshing gear 104; a reverse-rotation meshing gear 105; a plurality of second intermediate gears 106 meshed with one another; third intermediate gears 107; and a third gear 108. The second planetary gear mechanism 103 includes: the sun gear 109 meshed with the first output gear 75; two planetary gears 110, 111 each rotatable while revolving around the sun gear 109; and two arms 112, 113.

The sun gear 109 is rotatably supported by, e.g., the frame of the printing section 11. The sun gear 109 is rotated by the driving power transmitted from the first output gear 75 of the second power transmitter 27. That is, as in the case of the second power transmitter 27, the fourth power transmitter 28 receives the driving power from the first gear 78 when the switch gear 51 is located at the second power transmission position (see FIG. 7B).

The sun gear 109 has a thrust face on which one ends of the arms 112, 113 are mounted. Thus, the arms 112, 113 are rotated coaxially with the sun gear 109. The planetary gear 110 is rotatably supported on the other end of the arm 112. The planetary gear 111 is rotatably supported on the other end of the arm 113. The planetary gears 110, 111 are in meshed engagement with the sun gear 109. In the construction described above, the planetary gear 110 is rotated while supported by the arm 112 and is revolved in a rotational direction of the sun gear 109 while meshed with the sun gear 109. Also, the planetary gear 111 is rotated while supported by the arm 113 and is revolved in a rotational direction of the sun gear 109 while meshed with the sun gear 109.

The planetary gear 110 is meshable with the forward-rotation meshing gear 104. The planetary gear 111 is meshable with the reverse-rotation meshing gear 105. The reverse-rotation meshing gear 105 is in meshed engagement with the forward-rotation meshing gear 104. In addition to the reverse-rotation meshing gear 105, the forward-rotation meshing gear 104 is in meshed engagement with a rearmost one of the second intermediate gears 106.

The second intermediate gears 106 are arranged substantially in the front and rear directions 8 in a state in which the second intermediate gears 106 are meshed with one another. In the present embodiment, an even number of the second intermediate gears 106 are arranged. It is to be understood that, while the four second intermediate gears 106 are illustrated in FIG. 6, the number of the second intermediate gears 106 is not limited to four. The third intermediate gears 107 are provided coaxially with a frontmost one of the second intermediate gears 106. The third intermediate gears 107 are rotated about a shaft 79 together with the frontmost second intermediate gear 106. The third intermediate gears 107 are in meshed engagement with the third gear 108. The third gear 108 is disposed coaxially with the fourth conveyor rollers 68 so as to be rotatable together with the fourth conveyor rollers 68.

There will be next explained power transmission of the fourth power transmitter 28 with reference to FIG. 6. When the conveyor motor 71 is rotated in the forward direction, the first conveyor roller 60 and the first gear 78 are rotated in the counterclockwise direction, i.e., the first rotational direction, the switch gear 51 is rotated in the clockwise direction, and the first output gear 75 is rotated in the counterclockwise direction. The sun gear 109 is in turn rotated in the clockwise direction, i.e., in a direction indicated by arrow 114. As a result, the arms 112, 113 are also rotated in the direction indicated by arrow 114. Thus, the planetary gear 110 is meshed with the forward-rotation meshing gear 104, and the planetary gear 111 is disconnected or moved away from the reverse-rotation meshing gear 105. The planetary gear 111 meshed with the forward-rotation meshing gear 104 is rotated in the counterclockwise direction, whereby the forward-rotation meshing gear 104 is rotated in the clockwise direction.

Here, the even number of the second intermediate gears 106 are arranged in series between the forward-rotation meshing gear 104 and the third gear 108 in a state in which these gears are meshed with one another. It is noted that since the third intermediate gears 107 are rotated coaxially and together with the second intermediate gears 106, the number of the third intermediate gears 107 is not included in the above-described number of the second intermediate gears 106. In view of the above, when the forward-rotation meshing gear 104 is rotated in the clockwise direction, the third gear 108 and the fourth conveyor rollers 68 are rotated in the counterclockwise direction. That is, when the conveyor motor 71 is rotated in the forward direction, the fourth conveyor rollers 68 are rotated in the counterclockwise direction, i.e., the first rotational direction.

On the other hand, when the conveyor motor 71 is rotated in the reverse direction, each of the first conveyor roller 60 and the first gear 78 is rotated in the clockwise direction, i.e., the second rotational direction, the switch gear 51 is rotated in the counterclockwise direction, and the first output gear 75 is rotated in the clockwise direction. The sun gear 109 is in turn rotated in the counterclockwise direction, i.e., in a direction indicated by arrow 115. As a result, the arms 112, 113 are also rotated in the direction indicated by arrow 115. Thus, the planetary gear 110 is disconnected or moved away from the forward-rotation meshing gear 104, and the planetary gear 111 is meshed with the reverse-rotation meshing gear 105. The planetary gear 111 meshed with the reverse-rotation meshing gear 105 is rotated in the clockwise direction, whereby the reverse-rotation meshing gear 105 is rotated in the counterclockwise direction.

Here, the forward-rotation meshing gear 104 and the even number of the second intermediate gears 106 are arranged between the reverse-rotation meshing gear 105 and the third gear 108, that is, an odd number of gears are arranged in series between the reverse-rotation meshing gear 105 and the third gear 108 in a state in which these gears are meshed with one another. In view of the above, when the reverse-rotation meshing gear 105 is rotated in the counterclockwise direction, the third gear 108 and the fourth conveyor rollers 68 are also rotated in the counterclockwise direction. That is, even when the conveyor motor 71 is rotated in the reverse direction, the fourth conveyor rollers 68 are rotated in the counterclockwise direction, i.e., the first rotational direction.

In view of the above, the fourth power transmitter 28 transmits the forward and reverse rotational driving powers of the first conveyor roller 60, i.e., both of the rotational driving power in the counterclockwise direction and the rotational driving power in the clockwise direction, to the fourth conveyor rollers 68 as the rotational driving power for conveying the recording sheet 12 in the second direction 16, i.e., the rotational driving power in the first rotational direction.

The fourth power transmitter 28 increases a rotational speed of the first conveyor roller 60 in the counterclockwise direction, i.e., the first rotational direction and transmits the speed-increased rotational power to the fourth conveyor rollers 68. To increase the speed, for example, the fourth power transmitter 28 is designed as described below in detail in the present embodiment. It is noted that the fourth power transmitter 28 is not limited to have the construction as described below in detail, and the rotational speed of the first conveyor roller 60 may be increased by employing a well-known construction.

In the present embodiment, gear ratios of the gears of the fourth power transmitter 28 are set such that the fourth conveyor rollers 68 are rotated faster than the conveyor rollers 60, 62, 45. It is noted that the reverse-rotation meshing gear 105 is used for power transmission only when the first conveyor roller 60 is rotated in the clockwise direction, and a gear pitch (i.e., a distance between teeth) of this reverse-rotation meshing gear 105 is larger than that of the other gears of the fourth power transmitter 28. This pitch is set such that the fourth conveyor rollers 68 are rotated at the same speed as the conveyor rollers 60, 62, 45 when the first conveyor roller 60 is rotated in the clockwise direction.

In view of the above, the fourth conveyor rollers 68 receiving the driving power via the fourth power transmitter 28 are rotated at the same speed as the conveyor rollers 60, 62, 45 when the first conveyor roller 60 is rotated in the clockwise direction. On the other hand, when the first conveyor roller 60 is rotated in the counterclockwise direction, the fourth conveyor rollers 68 are rotated faster than the conveyor rollers 60, 62, 45. Among the gears of the fourth power transmitter 28, the gears used for the increase in speed are one example of a speed increasing mechanism.

<Supply Power Transmitter 29>

As illustrated in FIGS. 3-6, the supply power transmitter 29 includes: a second output gear 88; fourth intermediate gears 89; a fourth belt 90; two fifth intermediate gears 91; a sixth intermediate gear 92 mounted on a shaft 93; a third planetary gear mechanism 120; a seventh intermediate gear 121; an eighth intermediate gear 122; a fifth belt 94; and a supply pulley 123 provided coaxially with the supply rollers 25. The third planetary gear mechanism 120 includes: a sun gear 124 rotatable about and together with the shaft 93; a planetary gear 125 rotatable while revolving around the sun gear 124; and an arm 126.

The second output gear 88 is in meshed engagement with a rear one of the fourth intermediate gears 89. As will be described below, when the switch gear 51 is located at a first power transmission position, the second output gear 88 is meshed with the switch gear 51, so that the rotational driving power is transmitted from the first gear 78 to the second output gear 88 (see FIG. 7A). In the present embodiment, an even number of the fourth intermediate gears 89 (specifically, two fourth intermediate gears 89) are provided. A front one of the fourth intermediate gears 89 is disposed coaxially with a rear one of the two fifth intermediate gears 91.

The endless fourth belt 90 is looped over the two fifth intermediate gears 91. Specifically, the fourth belt 90 is disposed adjacent to the two fifth intermediate gears 91 and looped over two pulleys that are respectively rotated coaxially and together with the fifth intermediate gears 91.

A front one of the two fifth intermediate gears 91 is in meshed engagement with the sixth intermediate gear 92. The sixth intermediate gear 92 and the sun gear 124 of the third planetary gear mechanism 120 are rotated about and together with the shaft 93. The sun gear 124 has a thrust face on which one end of the arm 126 is mounted. Thus, the arm 126 is rotated about the shaft 93. The planetary gear 125 is rotatably supported on the other end of the arm 126. The planetary gear 125 is in meshed engagement with the sun gear 124. In the construction described above, the planetary gear 125 is rotated while supported by the arm 126 and is revolved around the sun gear 124 in a rotational direction of the sun gear 124 while meshed with the sun gear 124.

The seventh intermediate gear 121 is disposed at a position at which the seventh intermediate gear 121 is meshable with the planetary gear 125. The eighth intermediate gear 122 is in meshed engagement with the seventh intermediate gear 121. The endless fifth belt 94 is looped over the supply pulley 123 and the eighth intermediate gear 122 (specifically, a pulley disposed adjacent to the eighth intermediate gear 122 and rotatable coaxially and together with the eighth intermediate gear 122). It is noted that the supply rollers 25 and the supply pulley 123 are rotated coaxially and together with each other.

There will be next explained power transmission of the supply power transmitter 29 with reference to FIG. 6. When the conveyor motor 71 is rotated in the reverse direction, each of the first conveyor roller 60 and the first gear 78 is rotated in the clockwise direction, i.e., the second rotational direction. When the first gear 78 is rotated in the clockwise direction, the switch gear 51 is rotated in the counterclockwise direction, the second output gear 88 is rotated in the clockwise direction, the fourth intermediate gears 89 are rotated in the counterclockwise direction, and the two fifth intermediate gears 91 are rotated in the clockwise direction.

When the fifth intermediate gears 91 are rotated in the clockwise direction, the sixth intermediate gear 92 and the sun gear 124 provided coaxially with the sixth intermediate gear 92 are rotated in the counterclockwise direction. When the sun gear 124 is rotated in the counterclockwise direction, i.e., in a direction indicated by arrow 127, the planetary gear 125 is revolved around the sun gear 124 in the direction indicated by arrow 127. As a result, the planetary gear 125 is connected to and meshed with the seventh intermediate gear 121. When the planetary gear 125 and the seventh intermediate gear 121 are connected to and meshed with each other, the planetary gear 125 stops revolving and starts rotating. A direction of the rotation of the planetary gear 125 is the clockwise direction. Thus, when the planetary gear 125 is rotated, the seventh intermediate gear 121 meshed with the planetary gear 125 is rotated in the counterclockwise direction.

When the seventh intermediate gear 121 is rotated in the counterclockwise direction, the eighth intermediate gear 122 and the supply pulley 123 are rotated in the clockwise direction. When the supply pulley 123 is rotated in the clockwise direction, the supply rollers 25 are also rotated in the clockwise direction, i.e., the second rotational direction. When the supply rollers 25 are rotated in the clockwise direction, i.e., the second rotational direction, the recording sheet 12 placed on the supply tray 20 and contacting the supply rollers 25, i.e., an uppermost one of the recording sheets 12 placed on the supply tray 20 is supplied toward the first conveyor roller 60.

On the other hand, when the conveyor motor 71 is rotated in the forward direction, the sun gear 124 is rotated in the clockwise direction, i.e., in a direction indicated by arrow 128 in contrast to the case where the conveyor motor 71 is rotated in the reverse direction. Thus, the planetary gear 125 is revolved around the sun gear 124 in the direction indicated by arrow 128. As a result, the planetary gear 125 is disconnected or moved away from the seventh intermediate gear 121. In view of the above, when the conveyor motor 71 is rotated in the forward direction, the rotational driving power is not transmitted from the conveyor motor 71 to the supply rollers 25, not causing the rotation of the supply rollers 25.

<Switcher 30>

As illustrated in FIGS. 3-7B, the switcher 30 includes the switch gear 51, coil springs 56, 57, and a switch lever 55 as one example of a contact member.

Figures 7A, 7B:
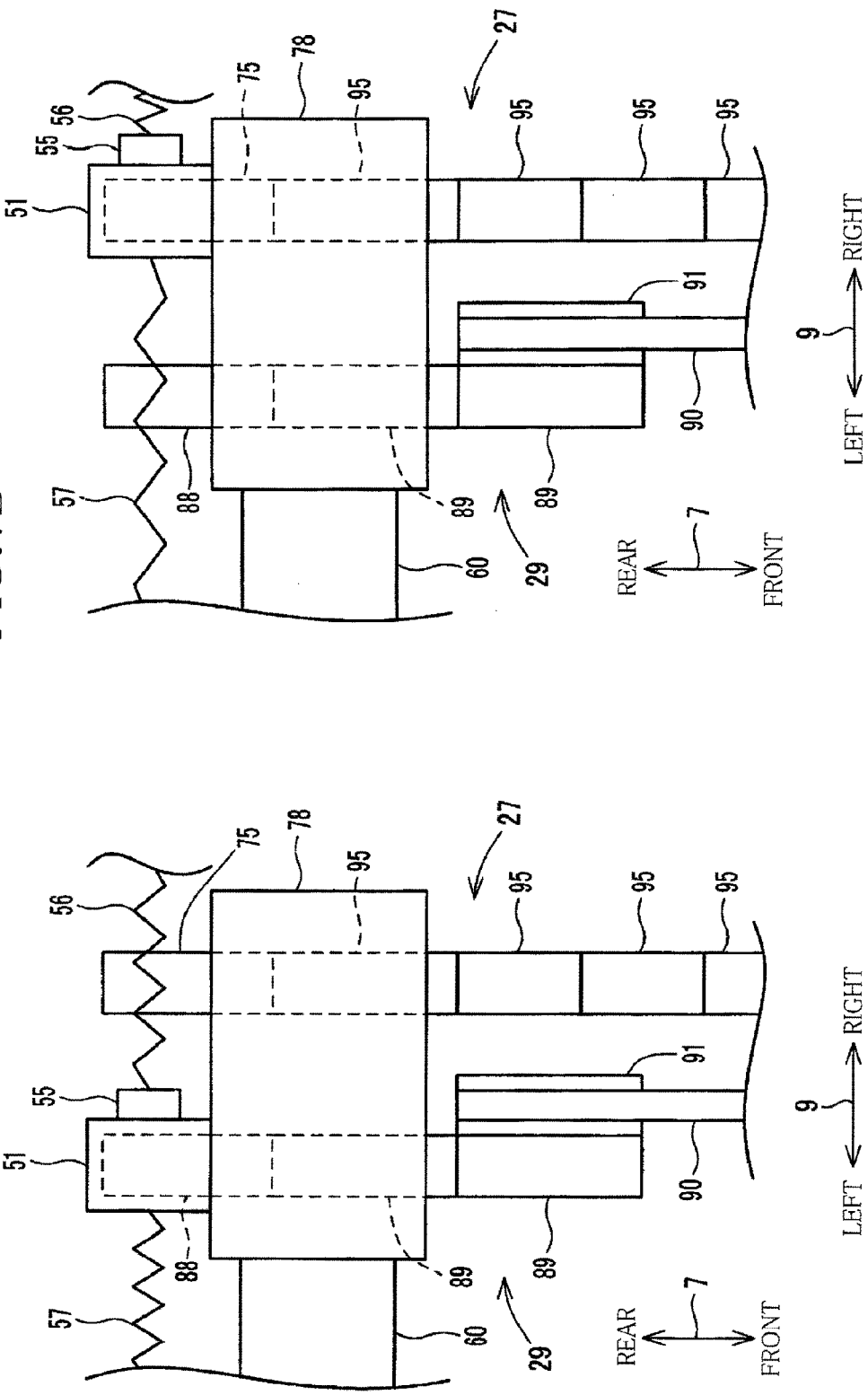
FIG. 7A is a plan view schematically illustrating meshing states of gears 51, 75, 78, 88 with a switch gear 51 located at a first power transmission position.
FIG. 7B is a plan view schematically illustrating the meshing states of gears 51, 75, 78, 88 with the switch gear 51 located at a second power transmission position.

As illustrated in FIGS. 7A and 7B, the switch gear 51 is in meshed engagement with the first gear 78. Thus, the switch gear 51 is rotated by the driving power transmitted from the conveyor motor 71. The switch gear 51 is movable in the right and left directions 9 at least between the first power transmission position (as one example of a first position) indicated in FIG. 7A and the second power transmission position (as one example of a second position) indicated in FIG. 7B in a state in which the switch gear 51 is meshed with the first gear 78. The first power transmission position is located on a left side of the second power transmission position. Each of the first power transmission position and the second power transmission position is located on a right side of the first conveyance path 65.

As illustrated in FIG. 7A, when the switch gear 51 is located at the first power transmission position, the switch gear 51 is connected to (i.e., meshed with) the first gear 78 and the fourth intermediate gear 89. It is noted that the switch gear 51 is not meshed with the first output gear 75 in this state. As a result, the rotational driving power transmitted from the conveyor motor 71 to the switch gear 51 via the first gear 78 is transmitted to the supply power transmitter 29.

As illustrated in FIG. 7B, when the switch gear 51 is located at the second power transmission position, the switch gear 51 is connected to (i.e., meshed with) the first gear 78 and the first output gear 75. It is noted that the switch gear 51 is not meshed with the fourth intermediate gear 89 in this state. As a result, the rotational driving power transmitted from the conveyor motor 71 to the switch gear 51 via the first gear 78 is transmitted to the second power transmitter 27 and the fourth power transmitter 28.

As illustrated in FIGS. 7A and 7B, a right face of the switch gear 51 is contactable with the switch lever 55. The carriage 40 of the recording portion 24 is contactable with the switch lever 55 from the left side. Also, the switch lever 55 is provided with the coil spring 56. The switch lever 55 and the coil spring 56 are arranged along an axial direction of the switch gear 51. One end of the coil spring 56 is mounted on a right face of the switch lever 55, and the other end of the coil spring 56 is mounted on, e.g., the frame of the printing section 11, not shown. As a result, the switch lever 55 is urged by the coil spring 56 from a side nearer to the second power transmission position toward a side nearer to the first power transmission position, i.e., in a leftward direction. Also, the coil spring 57 is mounted on the switch gear 51 on an opposite side thereof from the coil spring 56. As a result, the switch gear 51 is urged by the coil spring 57 from the side nearer to the first power transmission position toward the side nearer to the second power transmission position, i.e., in a rightward direction. It is noted that an urging force of the coil spring 56 is greater than that of the coil spring 57. Therefore, the switch gear 51 and the switch lever 55 are urged from the side nearer to the second power transmission position toward the side nearer to the first power transmission position, i.e., in the leftward direction.

The switch gear 51 located at the first power transmission position is inhibited by a stopper, not shown, from being moved by the urging force of the coil spring 56 from the second power transmission position toward the first power transmission position, i.e., in the leftward direction. This keeps the switch gear 51 at the first power transmission position. When the switch gear 51 located at the first power transmission position is pushed by the carriage 40 so as to be moved rightward from the first power transmission position, the switch gear 51 is released from the stopper and moved from the first power transmission position (see FIG. 7A) to the second power transmission position (see FIG. 7B). It is noted that the stopper is designed to inhibit or stop the leftward movement of the switch gear 51 at the first power transmission position and the second power transmission position but also designed not to inhibit or stop the rightward movement of the switch gear 51 at the first power transmission position and the second power transmission position.

As in the case of the switch gear 51 located at the first power transmission position, the switch gear 51 located at the second power transmission position is inhibited by a stopper, not shown, (having a construction similar to that of the stopper provided at the first power transmission position) from being moved by the urging force of the coil spring 56 from the second power transmission position toward the first power transmission position, i.e., in the leftward direction. This keeps the switch gear 51 at the second power transmission position.

When the switch gear 51 located at the second power transmission position is pushed by the carriage 40 so as to be moved rightward from the second power transmission position, the switch gear 51 is released from the stopper. When the carriage 40 is moved leftward in this state, the switch gear 51 is moved by the urging force of the coil spring 56 from the second power transmission position to the first power transmission position.

In view of the above, the switcher 30 selectively switches the power transmission from the first conveyor roller 60 to the second power transmitter 27 and the fourth power transmitter 28, or the supply power transmitter 29. Specifically, when the switch gear 51 is located at the second power transmission position, the switcher 30 transmits the driving power from the first conveyor roller 60 to the second power transmitter 27 and the fourth power transmitter 28. On the other hand, when the switch gear 51 is located at the first power transmission position, the switcher 30 does not transmit the driving power from the first conveyor roller 60 to the second power transmitter 27. It is noted that, when the switch gear 51 is located at the first power transmission position, the switcher 30 transmits the driving power from the first conveyor roller 60 to the supply power transmitter 29.

<Controller 130>

Figure 9:
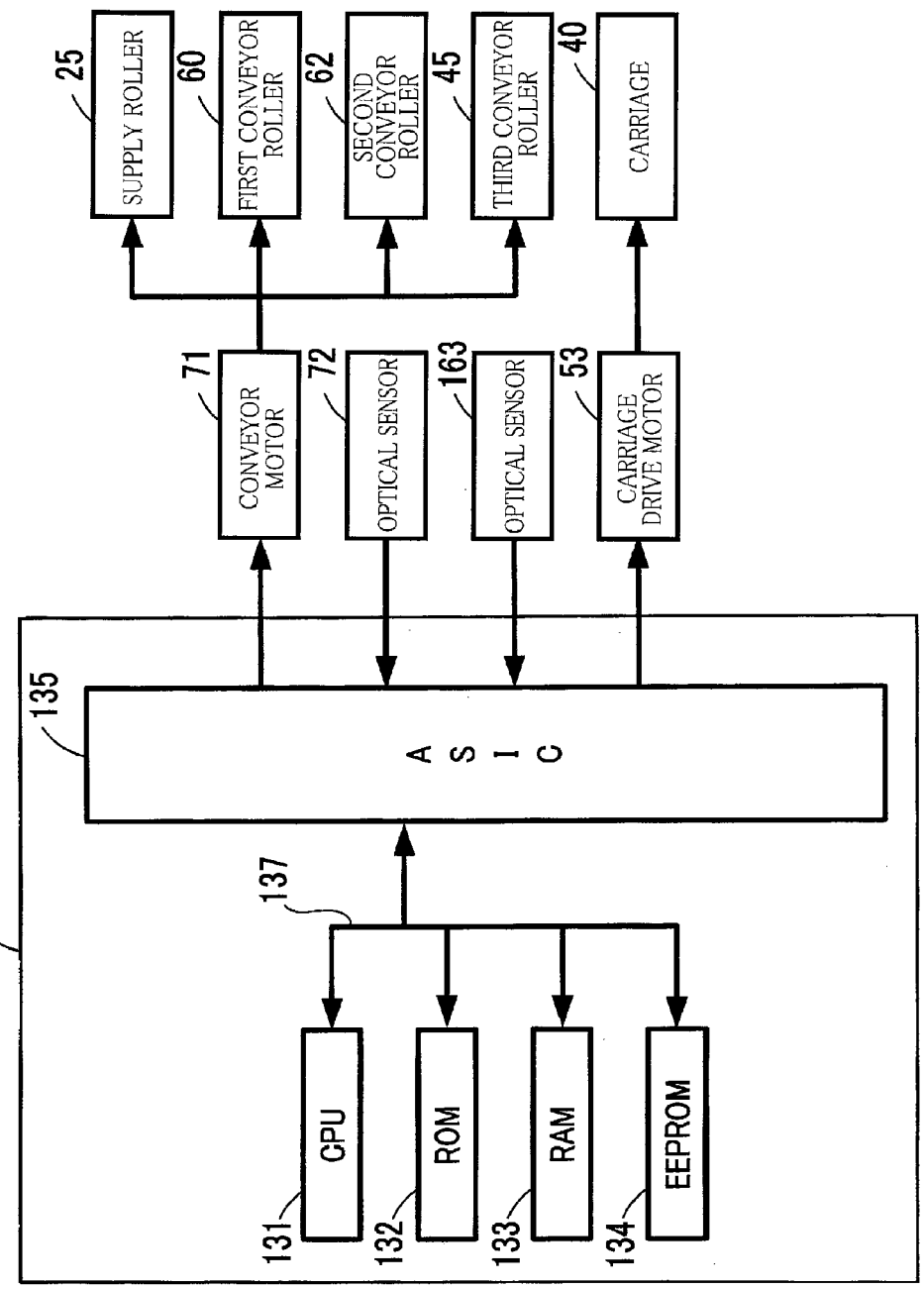
FIG. 9 is a block diagram illustrating a configuration of a controller 130.

The controller 130 illustrated in FIG. 9 controls overall operations of the MFP 10. For example, the controller 130 controls the conveyor motor 71. The controller 130 also controls the carriage drive motor 53 to move the carriage 40 in order to control the switcher 30 to switch the transmission of the driving power. As illustrated in FIG. 9, the controller 130 includes a CPU 131, a ROM 132, a RAM 133, an EEPROM 134, an ASIC 135, and an internal bus 137 for connecting these devices to one another.

The ROM 132 stores various programs and data for the CPU 131 to control various operations. The RAM 133 is used as a storage area for temporarily storing, e.g., data and signals used when the CPU 131 executes the programs. The EEPROM 134 is for storing settings, flags, and other similar data which should be kept after the MFP 10 is turned off.

Connected to the ASIC 135 are the conveyor motor 71 and the carriage drive motor 53. When a drive signal for rotating each motor is input from the CPU 131 to a corresponding drive circuit, a drive current related to the drive signal is output from the drive circuit to the motor, causing the motor to be rotated forwardly or reversely at a predetermined rotational speed.

Also, a pulse signal output from the optical sensor 72 of the rotary encoder 73 is input to the ASIC 135. On the basis of this pulse signal transmitted from the optical sensor 72, the controller 130 detects rotational amounts of the conveyor rollers 60, 62, 45.

Also, the optical sensor 163 of the sensor 160 is connected to the ASIC 135. On the basis of a signal transmitted from the optical sensor 163, the controller 130 detects a downstream edge (i.e., a leading edge) and an upstream edge (a trailing edge) of the recording sheet 12 in the first direction 15 at the position of the sensor 160.

<Controls of Controller 130>

Figure 10:
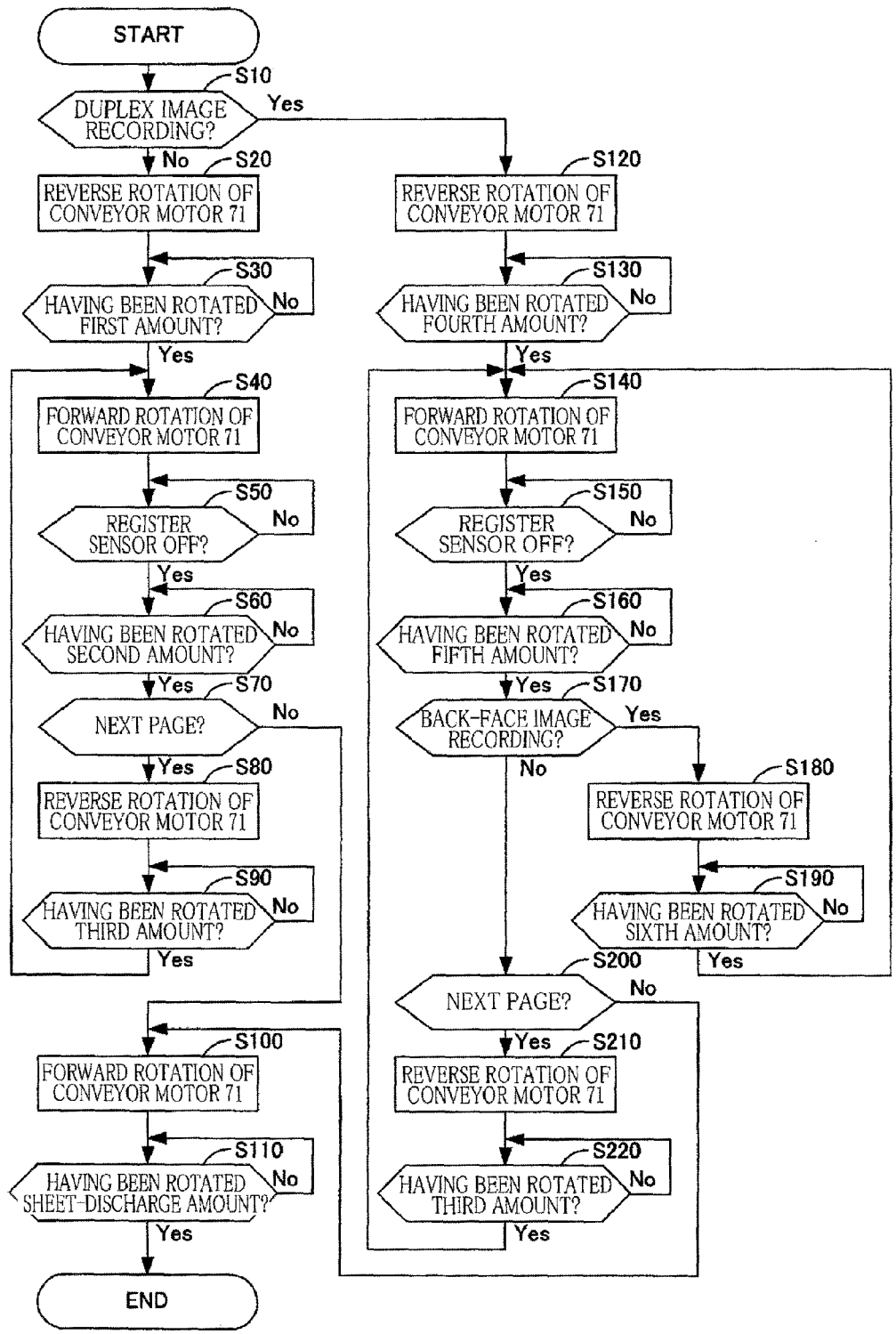
FIG. 10 is a flow chart for explaining a control executed by the controller 130 to convey the recording sheet 12.

There will be next explained, with reference to the flow chart in FIG. 10, a procedure of processings executed by the controller 130 for simplex image recording and duplex image recording on the recording sheet 12. It is noted that a control for conveying the recording sheet 12 is mainly explained in FIG. 10. Also, an initial position of the switcher 30 is the first power transmission position in the flow in FIG. 10.

When a command for image recording on the recording sheet 12 is input to the MFP 10 from, e.g., an operation panel 17 (see FIG. 1), the controller 130 at S10 determines whether the command is for the simplex image recording or the duplex image recording.

<Simplex Image Recording>

When the command is for the simplex image recording (S10: No), the controller 130 at S20 rotates the conveyor motor 71 in the reverse direction. This rotation causes the supply rollers 25 to be rotated in the clockwise direction, i.e., the second rotational direction in FIGS. 2 and 6. As a result, the recording sheet 12 placed on the supply tray 20 is supplied by the supply rollers 25 from the supply tray 20 toward the first conveyor roller 60 so as to be conveyed in the first direction 15 along the first conveyance path 65.

Also, when the conveyor motor 71 is rotated in the reverse direction, the first conveyor roller 60 are rotated in the clockwise direction, i.e., the second rotational direction in FIGS. 2 and 6. When the leading edge of the recording sheet 12 in the first direction 15 reaches the first conveyor roller 60, the leading edge comes into contact with the first conveyor roller 60 rotating in the clockwise direction, i.e., the second rotational direction, whereby oblique conveyance of the recording sheet 12 is corrected.

The controller 130 at S30 rotates the conveyor motor 71 in the reverse direction by a first rotational amount. Here, the first rotational amount is set at an amount enough for the leading edge of the recording sheet 12 in the first direction 15 to be conveyed from the supply tray 20 to the first conveyor roller 60. Thus, when the conveyor motor 71 is rotated in the reverse direction by the first rotational amount, the recording sheet 12 is sensed by the sensor 160.

When the conveyor motor 71 is rotated in the reverse direction by the first rotational amount (S30: Yes), the controller 130 at 540 switches the rotational direction of the conveyor motor 71 from the reverse direction to the forward direction. As a result, the supply rollers 25 are stopped, and the conveyor rollers 60, 62, 45 are rotated in their respective directions to convey the recording sheet 12 in the first direction 15. As a result, the recording sheet 12 is conveyed in the first direction 15 by the conveyor rollers 60, 62, 45 along the first conveyance path 65. It is noted that at S40 the first conveyor roller 60 is rotated in the counterclockwise direction, i.e., the first rotational direction, and the second conveyor rollers 62 and the third conveyor rollers 45 are rotated in the clockwise direction, i.e., the second rotational direction.

The controller 130 at S60 rotates the conveyor motor 71 in the forward direction by a second rotational amount. In the present embodiment, the second rotational amount is set at an amount enough for the recording portion 24 to complete the image recording on the recording sheet 12. Specifically, the second rotational amount is set at an amount enough for the trailing edge of the recording sheet 12 in the first direction 15 to be conveyed from the first conveyor roller 60 and then pass through the position just under the recording portion 24.

Thus, before the conveyor motor 71 has been rotated by the second rotational amount in the forward direction, the trailing edge of the recording sheet 12 in the first direction 15 passes through the sensor 160. As a result, the sensor 160 ceases sensing the recording sheet 12 (S50: Yes). Also, before the conveyor motor 71 has been rotated by the second rotational amount in the forward direction, the trailing edge of the recording sheet 12 in the first direction 15 passes through the first conveyor roller 60. It is noted that the controller 130 in the image recording alternately executes a recording processing for reciprocating the recording portion 24 in the right and left directions 9 and a conveyance processing for conveying the recording sheet 12 after the recording processing. Accordingly, the second rotational amount is a sum of rotational amounts in respective conveyance processings in the image recording.

When the image recording on the recording sheet 12 is completed, the controller 130 at S70 determines, based on the image recording command, whether there is a next page for image recording or not. When there is a next page (S70: Yes), the controller 130 at S80 switches the rotational direction of the conveyor motor 71 from the forward direction to the reverse direction. As a result, the second conveyor rollers 62 and the third conveyor rollers 45 are stopped. Also, the supply rollers 25 and the first conveyor roller 60 are rotated in the clockwise direction, i.e., the second rotational direction. As a result, the recording sheet 12 placed on the supply tray 20 is supplied by the supply rollers 25 from the supply tray 20 to the first conveyance path 65 and conveyed in the first direction 15 along the first conveyance path 65.

The controller 130 at S90 rotates the conveyor motor 71 in the reverse direction by a third rotational amount. Here, the third rotational amount is set at the same amount as the first rotational amount in the present embodiment but may differ from the first rotational amount. As a result, a subsequent recording sheet 12 supplied at S80 is conveyed to the first conveyor roller 60. Here, since the first conveyor roller 60 are being rotated in the clockwise direction, i.e., the second rotational direction, the recording sheet 12 supplied at S80 does not pass through the first conveyor roller 60. Also, since the second conveyor rollers 62 and the third conveyor rollers 45 are stopped, the prior recording sheet 12 supplied at S20 is kept stopped.

Executing the processings at S70-S90 allows the subsequent recording sheet 12 to be conveyed to a position just upstream of the recording portion 24 at a relatively early timing. This makes it possible to reduce a length of time required for a series of processings from the supply of the prior recording sheet 12 to the discharge of the prior sheet 12 after the image recording.

After the processing at S90, the processings at S40-S90 are repeated until the controller 130 at S70 determines that there is no next page (S70: No). The processings at S20-S90 are one example of a first control.

When the controller 130 at S70 determines that there is no next page (S70: No), the controller 130 at S100 continues rotating the conveyor motor 71 in the forward direction (noted that this forward rotation is continued from the processing at S40). As a result, the recording sheet 12 is conveyed by the second conveyor rollers 62 and the third conveyor rollers 45 in the first direction 15 along the first conveyance path 65.

The controller 130 at S120 rotates the conveyor motor 71 in the forward direction by a discharge rotational amount. Here, the discharge rotational amount is set at an amount enough for the recording sheet 12 to be discharged onto the output tray 21. When the conveyor motor 71 is rotated in the forward direction by the discharge rotational amount, the recording sheet 12 is discharged onto the output tray 21.

<Duplex Image Recording>

On the other hand, when the image recording command is for the duplex image recording (S10: Yes), the controller 130 at S120 rotates the conveyor motor 71 in the reverse direction. In the present embodiment, processings at S120-S160 are respectively similar to those at S20-S60. It is noted that a fourth rotational amount is the same amount as the first rotational amount in the present embodiment but may differ from the first rotational amount. In the present embodiment, a fifth rotational amount is set at an amount larger than the second rotational amount. Specifically, the fifth rotational amount is set at an amount enough not only for the trailing edge of the recording sheet 12 in the first direction 15 to be conveyed from the first conveyor roller 60 and then pass through the position just under the recording portion 24, but also for the trailing edge to pass through the auxiliary roller 47 of the path switching member 41.

When the image recording on the recording sheet 12 is completed at S160, the controller 130 at S170 determines, based on the image recording command, whether an image-recorded face of the recording sheet 12 is a front face or not, that is, the controller 130 determines whether there is a need to perform the image recording on a back face or not. When the image recording needs to be performed on the back face (S170: Yes), the controller 130 controls the carriage drive motor 53 to move the carriage 40, whereby the switcher 30 is moved or switched from the first power transmission position to the second power transmission position.

Then at S180, the controller 130 rotates the conveyor motor 71 in the reverse direction. As a result, the conveyor rollers 60, 62, 45 are rotated in the direction in which the recording sheet 12 is conveyed in the direction opposite to the first direction 15. It is noted that at S180 the first conveyor roller 60 is rotated in the clockwise direction, i.e., the second rotational direction, and the second conveyor rollers 62 and the third conveyor rollers 45 are rotated in the counterclockwise direction, i.e., the first rotational direction. Here, since the recording sheet 12 has passed through the auxiliary roller 47, the path switching member 41 has been pivoted to the flip orientation. Thus, the recording sheet 12 is conveyed in the direction opposite to the first direction 15 to the second conveyance path 67 while guided by the path switching member 41.

The controller 130 at S190 rotates the conveyor motor 71 in the reverse direction by a sixth rotational amount. Here, in the present embodiment, the sixth rotational amount is set at an amount enough for the recording sheet 12 to pass through the second conveyance path 67 and reaches the first conveyor roller 60 at the leading edge of the recording sheet 12 in the first direction 15.

The controller 130 then executes the processings at S140-S170 again. As a result, an image is recorded on the back face of the recording sheet 12. The processings at S120-S190 are one example of a second control.

When the image recording is completed for the front and back faces (S170: No), this flow goes to S200 at which the controller 130 determines, based on the image recording command, whether there is a next page for image recording or not. When there is a next page (S200: Yes), the controller 130 moves the carriage 40, whereby the switcher 30 is moved or switched from the second power transmission position to the first power transmission position.

The controller 130 then executes processings at S210 and S220. Here, the processings at S210 and S220 are respectively similar to the processings at S80 and S90. It is noted that after the conveyor motor 71 is rotated at S220 by the third rotational amount, the processing at S140 is executed again.

The controller 130 thereafter repeats the processings at S140-S220 until the controller 130 at S200 determines that there is no next page (S200: No).

When the controller 130 at S200 determines that there is no next page (S200: No), the controller 130 executes the processings at S100 and S110. As a result, the recording sheet 12 is discharged onto the output tray 21.

<Effects of Embodiment>

In the present embodiment, the rotational driving power in the first rotational direction is transmitted to the second conveyor rollers 62 by the first power transmitter 26. On the other hand, the rotational driving power in the second rotational direction is transmitted to the second conveyor rollers 62 by the second power transmitter 27. Therefore, in the present embodiment, the second conveyor rollers 62 can be rotatable only in one direction and can be rotatable in two directions. That is, the second conveyor rollers 62 rotatable in only one direction in a certain situation can be made rotatable in two directions in another situation.

Also, in the present embodiment, the first power transmitter 26 and the second power transmitter 27 are arranged such that the recording sheet 12 passes through a position between the first power transmitter 26 and the second power transmitter 27. As a result, the first power transmitter 26 and the second power transmitter 27 are arranged at respective areas where a speed of the recording portion 24 needs to be increased, resulting in reduced size of the MFP 10.

Also, the MFP 10 including the one-way clutch and the first planetary gear mechanism 96 is preferable to realize functions of the first power transmitter 26 and the second power transmitter 27.

Also, in the present embodiment, the first power transmitter 26 transmits the rotational driving power in the first rotational direction from the first conveyor roller 60 to the second conveyor rollers 62 via the second belt 83 but does not transmit the rotational driving power in the second rotational direction to the second conveyor rollers 62 due to the one-way clutch. In contrast, when the second power transmitter 27 is receiving the rotational driving power in the second rotational direction, the planetary gear 98 is connected to and meshed with the second gear 101, and accordingly the second power transmitter 27 transmits the rotational driving power in the second rotational direction to the second conveyor rollers 62. On the other hand, when the second power transmitter 27 is receiving the rotational driving power in the first rotational direction, the planetary gear 98 is disconnected from the second gear 101, and accordingly the second power transmitter 27 does not transmit the rotational driving power in the first rotational direction to the second conveyor rollers 62. In view of the above, this construction is preferable to realize the above-described effects in which the second conveyor rollers 62 rotatable in only one direction in a certain situation are made rotatable in two directions in another situation.

Also, when the rotational driving power in the second rotational direction is being transmitted to the second conveyor rollers 62 by the second power transmitter 27, the rotational driving power in the second rotational direction is transmitted by the first power transmitter 26 to the second pulley 82 that is coaxial with the second conveyor rollers 62. In this transmission, a mechanical error of components such as a gear and a pulley may unfortunately cause a situation in which the rotational speed of the second conveyor rollers 62 receiving the driving power transmitted by the second power transmitter 27 is faster than that of the second pulley 82 receiving the driving power transmitted by the first power transmitter 26. In this situation, the second belt 83 provided on the second pulley 82 may be slackened, causing the second belt 83 to be detached from the second pulley 82 or the first pulley 81.

To solve these problems, in the present embodiment, the rotational speed of the first conveyor roller 60 is reduced, and the rotational driving power is transmitted to the second conveyor rollers 62. This configuration makes it possible to reliably prevent the rotational speed of the second conveyor rollers 62 receiving the driving power transmitted by the second power transmitter 27 from being faster than that of the second pulley 82 receiving the driving power transmitted by the first power transmitter 26. Thus, it is possible to reliably prevent the second belt 83 from being detached as described above.

Also, in the present embodiment, when the third conveyor rollers 45 are rotated in the second rotational direction, the fourth conveyor rollers 68 are rotated in the first rotational direction. Thus, in a case where a leading edge of the recording sheet 12 in the second direction 16 conveyed along the second conveyance path 67 is nipped between the roller pair of the driven roller 69 and the fourth conveyor rollers 68, and a trailing edge of the recording sheet 12 in the second direction 16 is nipped between the roller pair of the spur 46 and the third conveyor rollers 45, both of the fourth conveyor rollers 68 and the third conveyor rollers 45 may pull the recording sheet 12. In order to solve this problem, in the present embodiment, the fourth power transmitter 28 speeds up the rotational driving power of the first conveyor roller 60 in the first rotational direction and transmits the rotational driving power to the fourth conveyor rollers 68. As a result, when both of the fourth conveyor rollers 68 and the third conveyor rollers 45 pull the recording sheet 12, the fourth conveyor rollers 68 can pull out the recording sheet 12 nipped between the roller pair of the spur 46 and the third conveyor rollers 45.

Also, in the present embodiment, when the rotational driving power in the second rotational direction is transmitted from the first conveyor roller 60 to the supply rollers 25, the supply rollers 25 are rotated to supply the recording sheet 12 toward the first conveyor roller 60. In this conveyance, the first conveyor roller 60 is rotated in the second rotational direction, making it possible to correct the oblique conveyance of the recording sheet 12 by the contact of the recording sheet 12 with the first conveyor roller 60. This correction can be realized by a single motor, eliminating a need to provide a motor specific to the supply rollers 25 to correct the oblique conveyance of the recording sheet 12.

Also, in the present embodiment, the switch lever 55 is moved by the contact with the moving carriage 40, whereby a connecting state between the first gear 78 and the second power transmitter 27 can be switched. That is, the movement of the carriage 40 is utilized to activate the switcher 30, eliminating a need to provide a specific drive source for activating the switcher 30.

Also, in the present embodiment, the first control allows the simplex image recording on the recording sheet 12 to be appropriately performed. Also, the second control allows the duplex image recording on the recording sheet 12 to be appropriately performed. That is, only the conveyor motor 71 can reduce a length of time required for the simplex image recording on a plurality of sheets, can correct the oblique conveyance of the recording sheet 12 using the first conveyor roller 60, and can perform the duplex image recording.

<Modification>

In the present embodiment, when the conveyor motor 71 is rotated in the forward direction, the first conveyor roller 60 is rotated in the first rotational direction, and the second conveyor rollers 62 and the third conveyor rollers 45 are rotated in the second rotational direction, but the present invention is not limited to this configuration. Also, when the conveyor motor 71 is rotated in the reverse direction, the first conveyor roller 60 is rotated in the second rotational direction, and the second conveyor rollers 62 and the third conveyor rollers 45 are rotated in the first rotational direction, but the present invention is not limited to this configuration. For example, in contrast to the present embodiment, the MFP 10 may be configured such that when the conveyor motor 71 is rotated in the forward direction, the first conveyor roller 60 is rotated in the second rotational direction, and the second conveyor rollers 62 and the third conveyor rollers 45 are rotated in the first rotational direction. Also, in contrast to the present embodiment, the MFP 10 may be configured such that when the conveyor motor 71 is rotated in the reverse direction, the first conveyor roller 60 is rotated in the first rotational direction, and the second conveyor rollers 62 and the third conveyor rollers 45 are rotated in the second rotational direction.

In the present embodiment, the first power transmitter 26 and the second power transmitter 27 are arranged such that the recording sheet 12 passes through the area between the first power transmitter 26 and the second power transmitter 27, but the present invention is not limited to this configuration. For example, both of the first power transmitter 26 and the second power transmitter 27 may be arranged on one side of the area in the right and left directions 9.

In the present embodiment, the one-way clutch is provided in the second pulley 82 mounted on the shaft 64 of the second conveyor rollers 62, but the present invention is not limited to this configuration. For example, the MFP 10 may be configured such that a one-way clutch is provided between the shaft 34 of the first conveyor roller 60 and the shaft 64 of the second conveyor rollers 62, a pulley for supporting the second belt 83 is disposed so as to be meshed with the second pulley 82. Also, a one-way clutch is provided in the first pulley 81.

In the present embodiment, the planetary gear 98 is meshed with the second gear 101 mounted on the shaft 64 of the second conveyor rollers 62, but the present invention is not limited to this configuration. For example, a gear may be disposed between the planetary gear 98 and the second gear 101. In this case, the gear and the second gear 101 are one example of a drive mechanism.

In the present embodiment, when the sun gear 97 is rotated in the clockwise direction, the planetary gear 98 is connected to the second gear 101, but the present invention is not limited to this configuration. For example, in contrast to the present embodiment, when the sun gear 97 is rotated in the counter-clockwise direction, the planetary gear 98 may be connected to the second gear 101. In this case, an odd number of the first intermediate gears 95 are provided while the even number of the first intermediate gears 95 are provided in the present embodiment. In addition, an odd number of gears are provided between the planetary gear 98 and the second gear 101.

In the present embodiment, each of the first rotational amount, the third rotational amount, and the fourth rotational amount of the conveyor motor 71 is set at an amount enough for the leading edge of the recording sheet 12 in the first direction 15 to be conveyed from the supply tray 20 to the first conveyor roller 60, but the present invention is not limited to this configuration. For example, the conveyor motor 71 may be set at an amount by which the leading edge of the recording sheet 12 in the first direction 15 reaches the sensor 160. In this case, each of the second rotational amount and the fifth rotational amount is set at an amount enough for the trailing edge of the recording sheet 12 in the first direction 15 to be conveyed from the sensor 160 and pass through the position just under the recording portion 24.

Figure 11:
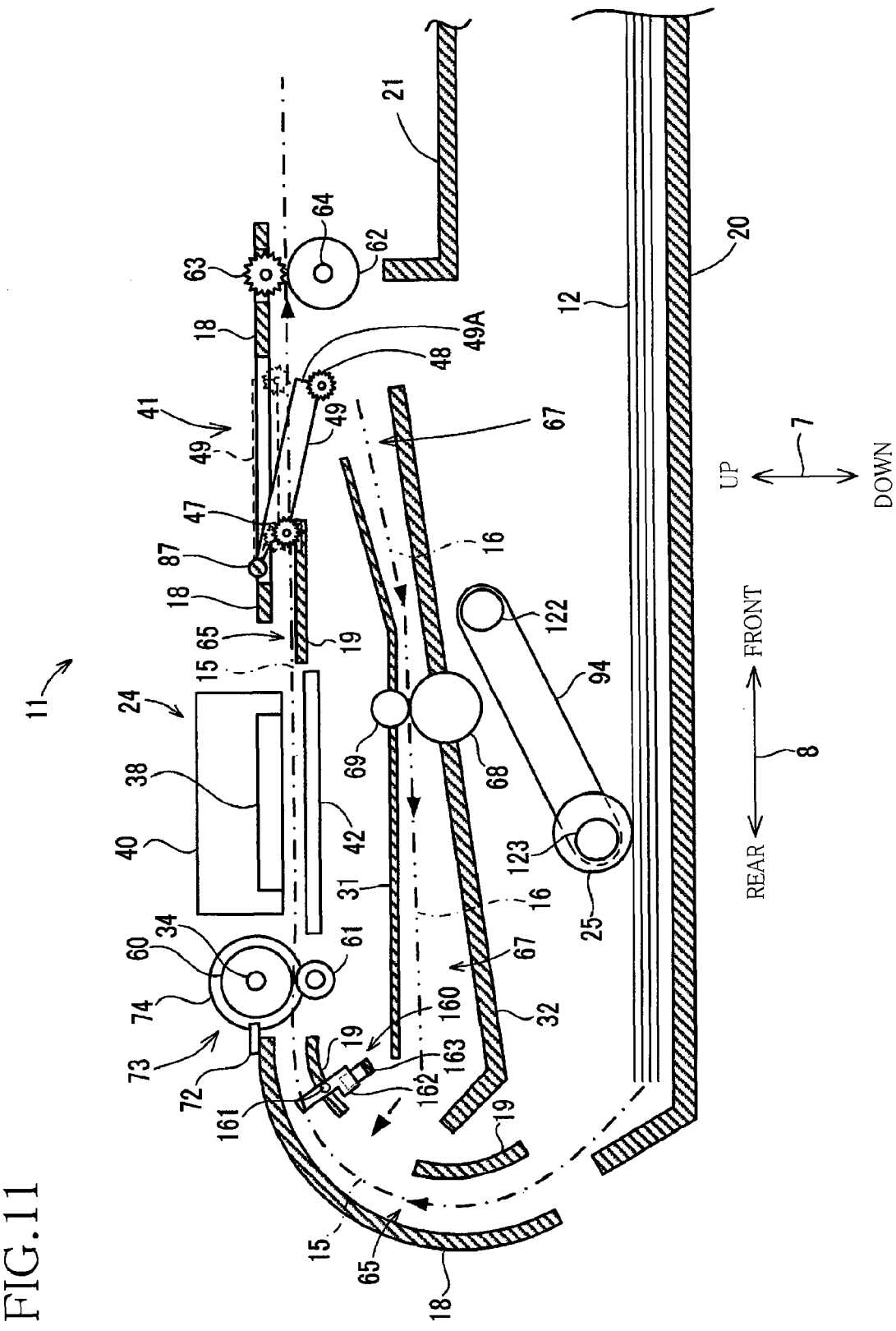
FIG. 11 is an elevational view in vertical cross section schematically illustrating an internal structure of a printing section 11 that does not include third conveyor rollers 45 and a spur 46 in FIG. 2.

The present invention may be applied to an embodiment as illustrated in FIG. 11. This embodiment mainly omits the third conveyor rollers 45, the spur 46, and the third power transmitter 33 of the above-described embodiment. In this embodiment, the second conveyance path 67 extends from a position between the recording portion 24 and the second conveyor rollers 62 to an upstream side of the first conveyor roller 60 in the first direction 15. In this embodiment, the second conveyor rollers 62 are one example of the second roller, and the second power transmitter 27 is one example of the second power transmitter.

It is to be understood that the above-described modifications may be implemented in combination as needed without departing from the scope and spirit of the invention.

What is claimed is:

1. An image recording apparatus, comprising:
a drive source configured to perform forward rotation and reverse rotation;
a first roller rotatable in a first direction by the forward rotation of the drive source to convey a conveyed medium in a conveying direction, the first roller being rotatable in a second direction by the reverse rotation of the drive source, the second direction being reverse to the first direction;
a recording device disposed downstream of the first roller in the conveying direction and configured to record an image on the conveyed medium;
a second roller disposed downstream of the recording device in the conveying direction;
a first power transmitter configured to transmit a first-direction driving power to the second roller to rotate the second roller in a third direction and not to transmit a second-direction driving power to the second roller, wherein the first-direction driving power is a rotational driving power of the first roller rotating in the first direction, and the second-direction driving power is a rotational driving power of the first roller rotating in the second direction; and
a second power transmitter configured to transmit the second-direction driving power of the first roller to the second roller to rotate the second roller in a fourth direction reverse to the third direction and not to transmit the first-direction driving power of the first roller to the second roller.

2. The image recording apparatus according to claim 1, wherein the second roller is configured to rotate in the third direction to convey the conveyed medium in the conveying direction when the first-direction driving power is transmitted to the second roller by the first power transmitter.

3. The image recording apparatus according to claim 1, wherein the first power transmitter comprises a one-way clutch mechanism configured to rotate the second roller when the first-direction driving power is transmitted to the one-way clutch mechanism, the one-way clutch mechanism being configured not to rotate the second roller when the second-direction driving power is transmitted to the one-way clutch mechanism, and
wherein the second power transmitter comprises:
a drive mechanism configured to drive the second roller; and
a planetary gear mechanism configured to be coupled to the drive mechanism when the second-direction driving power is transmitted to the planetary gear mechanism, the planetary gear mechanism being configured to be decoupled from the drive mechanism when the first-direction driving power is transmitted to the planetary gear mechanism.

4. The image recording apparatus according to claim 3, wherein the first power transmitter comprises:
   a first pulley rotatable together with the first roller;
   a second pulley provided coaxially with the second roller and comprising the one-way clutch mechanism; and
   a belt looped over the first pulley and the second pulley,
wherein the planetary-gear mechanism comprises:
   a rotatable sun gear; and
   a planetary gear capable of being revolved in a direction of rotation of the sun gear in a state in which the planetary gear is meshed with the sun gear,
wherein the second power transmitter comprises:
   a first roller gear provided coaxially with the first roller;
   a transmitter unit configured to transmit a rotational driving power of the first roller gear to the sun gear; and
   a second roller gear, as the drive mechanism, provided coaxially with the second roller,
wherein, when the second-direction driving power is transmitted from the first roller gear to the sun gear of the planetary gear mechanism, the sun gear is rotated in a direction in which the planetary gear is coupled to the second roller gear, and
wherein, when the first-direction driving power is transmitted from the first roller gear to the sun gear, the sun gear is rotated in a direction in which the planetary gear is decoupled from the second roller gear.

5. The image recording apparatus according to claim 3, wherein the second power transmitter comprises a speed reducer configured to reduce a rotational speed of the first roller and transmit the second-direction driving power to the second roller.

6. The image recording apparatus according to claim 1, further comprising:
   a third roller provided downstream of the second roller in the conveying direction;
   a third power transmitter configured to transmit a rotational driving power of the second roller to the third roller; and
   a switch mechanism disposed between the second roller and the third roller to cause an upstream edge of the conveyed medium in the conveying direction to be directed toward a reverse conveyance path which is continuous to a main conveyance path, wherein the main conveyance path is a path extending from a position located upstream of the first roller in the conveying direction to a position located upstream of the second roller in the conveying direction, and the conveyed medium is conveyed in the conveying direction through the main conveyance path.

7. The image recording apparatus according to claim 6, wherein the third roller is configured to rotate in one direction to convey the conveyed medium in the conveying direction when the first-direction driving power is transmitted to the second roller by the first power transmitter, and
wherein the third roller is configured to rotate in a direction reverse to the one direction when the second-direction driving power is transmitted to the second roller by the second power transmitter.

8. The image recording apparatus according to claim 6, further comprising:
   a fourth roller disposed at the reverse conveyance path and configured to convey the conveyed medium to the main conveyance path; and
   a fourth power transmitter configured to transmit the first-direction driving power and the second-direction driving power to the fourth roller and configured to rotate the fourth roller in only one direction when any of the first-direction driving power and the second-direction driving power is transmitted to the fourth roller.

9. The image recording apparatus according to claim 8, wherein the fourth roller is configured to rotate in the one direction to convey the conveyed medium from the reverse conveyance path to the main conveyance path.

10. The image recording apparatus according to claim 8, wherein the fourth power transmitter comprises a speed increasing mechanism configured to make a rotational speed of the first roller in the first direction greater than a rotational speed of the first roller in the second direction and transmit the first-direction driving power to the fourth roller.

11. The image recording apparatus according to claim 1, further comprising:
   a tray configured to hold a medium as the conveyed medium;
   a supply roller configured to supply the conveyed medium on the tray toward the first roller; and
   a supply power transmitter configured to transmit the second-direction driving power to the supply roller and not to transmit the first-direction driving power to the supply roller.

12. The image recording apparatus according to claim 11, wherein the second roller is configured to rotate in one direction to convey the conveyed medium when the second-direction driving power is transmitted to the supply roller by the supply power transmitter.

13. The image recording apparatus according to claim 11, wherein the supply power transmitter comprises:
   a supply drive mechanism configured to drive the supply roller; and
   a supply planetary gear mechanism configured to be coupled to the supply drive mechanism when the second-direction driving power is transmitted to the supply planetary gear mechanism, the supply planetary gear mechanism being configured to be decoupled from the supply drive mechanism when the first-direction driving power is transmitted to the supply planetary gear mechanism.

14. The image recording apparatus according to claim 13, wherein the supply planetary gear mechanism comprises:
   a rotatable supply sun gear; and
   a supply planetary gear capable of being revolved in a direction of rotation of the supply sun gear in a state in which the supply planetary gear is meshed with the supply sun gear;
wherein the supply drive mechanism comprises:
   a first roller gear provided coaxially with the first roller;
   a first supply power transmitter configured to transmit a rotational driving power of the first roller gear to the supply sun gear; and
   a second supply power transmitter configured to transmit a rotational driving power of the supply planetary gear to the supply roller,
wherein, when the second-direction driving power is transmitted to the supply sun gear of the supply planetary gear mechanism from the first roller gear, the supply sun gear causes the supply planetary gear to be coupled to the second supply power transmitter, and wherein, when the first-direction driving power is transmitted to the supply sun gear from the first roller gear, the supply sun gear causes the supply planetary gear to be decoupled from the second supply power transmitter.

15. The image recording apparatus according to claim 14, wherein the second supply power transmitter comprises an intermediate gear, wherein, when the second-direction driving power is transmitted to the supply planetary gear, the supply planetary gear is coupled to the intermediate gear, and wherein, when the first-direction driving power is transmitted to the supply planetary gear, the supply planetary gear is moved away from the intermediate gear.

16. The image recording apparatus according to claim 11, wherein the recording device comprises a carriage movable in main scanning directions perpendicular to the conveying direction, and wherein the image recording apparatus comprises:
    a first roller gear configured to receive the rotational driving power of the first roller; and
    a switcher comprising a contact member contactable with the carriage moved in the main scanning directions, the switcher being configured to be switched, by contact of the carriage with the contact member, between a first position at which the switcher is coupled to the first roller gear and the supply power transmitter and not coupled to the second power transmitter and a second position at which the switcher is coupled to the first roller gear and the second power transmitter and not coupled to the supply power transmitter.

17. The image recording apparatus according to claim 16, further comprising a controller configured to control the drive source and the carriage, wherein the controller is configured, in a state in which the switcher is located at the first position, to:
    control the drive source to perform the reverse rotation to convey the conveyed medium from the tray to a position at which a downstream edge of the conveyed medium in the conveying direction reaches the first roller; then
    control the drive source to perform the forward rotation to convey the conveyed medium to a position at which an upstream edge of the conveyed medium in the conveying direction passes through the first roller; and then
    control the drive source to perform the reverse rotation.

18. The image recording apparatus according to claim 1, wherein the recording device comprises a carriage movable in main scanning directions perpendicular to the conveying direction, and wherein the image recording apparatus further comprises:
    a first roller gear configured to receive the rotational driving power of the first roller; and
    a switcher comprising a contact member contactable with the carriage moved in the main scanning directions, the switcher being configured to be switched, by contact of the carriage with the contact member, between a first position at which the switcher is coupled to the first roller gear and not coupled to the second power transmitter and a second position at which the switcher is coupled to the first roller gear and coupled to the second power transmitter.

19. The image recording apparatus according to claim 18, further comprising a controller configured to control the drive source and the carriage, wherein the controller is configured to control the drive source to perform the forward rotation, in a state in which the switcher is located at the first position, to convey the conveyed medium to a position at which a downstream edge of the conveyed medium in the conveying direction passes through the first roller, and then control the drive source to perform the reverse rotation in a state in which the switcher is located at the second position.

20. An image recording apparatus, comprising:
    a drive source configured to perform forward rotation and reverse rotation;
    a first roller rotatable in a first direction by the forward rotation of the drive source to convey a sheet in a conveying direction, the first roller being rotatable in a second direction by the reverse rotation of the drive source, the second direction being reverse to the first direction;
    a recording device provided downstream of the first roller in the conveying direction to record an image on the sheet, the recording device being reciprocable in main scanning directions perpendicular to the conveying direction;
    a second roller provided downstream of the recording device in the conveying direction;
    a tray configured to hold the sheet;
    a supply roller configured to supply the sheet on the tray toward the first roller;
    a first power transmitter configured to transmit a first-direction driving power to the second roller and not to transmit a second-direction driving power to the second roller, wherein the first-direction driving power is a rotational driving power of the first roller rotating in the first direction, and the second-direction driving power is a rotational driving power of the first roller rotating in the second direction;
    a second power transmitter configured to transmit the second-direction driving power of the first roller to the second roller and not to transmit the first-direction driving power of the first roller to the second roller;
    a supply power transmitter configured to transmit the second-direction driving power to the supply roller and not to transmit the first-direction driving power to the supply roller;
    a first roller gear configured to receive the rotational driving power of the first roller;
    a switcher comprising a contact member contactable with a carriage as the recording device moved in the main scanning directions, the switcher being configured to be switched, by contact of the carriage with the contact member, between a first position at which the switcher is coupled to the first roller gear and not coupled to the second power transmitter and coupled to the supply power transmitter and a second position at which the switcher is coupled to the first roller gear and coupled to the second power transmitter and not coupled to the supply power transmitter; and
    a controller configured to control the drive source and the carriage to execute:
        a first control in which the controller controls the drive source to perform the reverse rotation by a first rotational amount in a state in which the switcher is located at the first position, then controls the drive source to perform the forward rotation by a second rotational amount to convey the sheet to a position at which an upstream edge of the sheet in the conveying direction passes through the first roller, and then controls the drive source to perform the reverse rotation by a third rotational amount; and a second control in which the controller controls the drive source to perform the reverse rotation by a fourth rotational amount in the state in which the switcher is located at the first position, then controls the drive source to perform the forward rotation by a fifth rotational amount to convey the sheet to the position at which the upstream edge of the sheet in the conveying direction passes through the first roller, and then controls the drive source to perform the reverse rotation by a sixth rotational amount in a state in which the switcher is located at the second position.

* * * * *